(12) United States Patent
Otani et al.

(10) Patent No.: US 11,281,950 B2
(45) Date of Patent: Mar. 22, 2022

(54) IMAGE PROCESSING APPARATUS, IMAGE FORMING SYSTEM, IMAGE PROCESSING METHOD AND STORAGE MEDIUM

(71) Applicant: CANON KABUSHIKI KAISHA, Tokyo (JP)

(72) Inventors: Ryosuke Otani, Tokyo (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/092,371

(22) Filed: Nov. 9, 2020

(65) Prior Publication Data

US 2021/0158112 A1 May 27, 2021

(30) Foreign Application Priority Data

Nov. 27, 2019 (JP) .............................. JP2019-214297

(51) Int. Cl.
*G06K 15/00* (2006.01)
*G06K 15/10* (2006.01)
*G06K 15/02* (2006.01)

(52) U.S. Cl.
CPC ......... *G06K 15/408* (2013.01); *G06K 15/102* (2013.01); *G06K 15/1881* (2013.01)

(58) Field of Classification Search
CPC . G06K 15/408; G06K 15/102; G06K 15/1881
See application file for complete search history.

(56) References Cited

U.S. PATENT DOCUMENTS

| | | | |
|---|---|---|---|
| 9,690,228 B2 * | 6/2017 | Otani | ................... G03G 15/043 |
| 10,073,370 B2 | 9/2018 | Takikawa et al. | |
| 10,194,053 B2 | 1/2019 | Otani et al. | |
| 10,545,446 B2 | 1/2020 | Takikawa et al. | |
| 2015/0043836 A1 * | 2/2015 | Shibata | .................. B41J 2/2139 |
| | | | 382/299 |
| 2020/0156386 A1 | 5/2020 | Otani et al. | |
| 2020/0247137 A1 | 8/2020 | Otani et al. | |
| 2020/0349405 A1 | 11/2020 | Otani et al. | |

FOREIGN PATENT DOCUMENTS

JP 2012-071474 A 4/2012

* cited by examiner

*Primary Examiner* — Quang N Vo
(74) *Attorney, Agent, or Firm* — Carter, DeLuca & Farrell LLP

(57) ABSTRACT

To implement non-ejection complementation processing while securing a chance for a nozzle in which an ejection failure has occurred to recover as a normal nozzle. Positional information for specifying an abnormal nozzle in which an ejection failure has occurred among a plurality of nozzles arrayed in a nozzle column is acquired and based on the positional information, input image data is converted into halftone image data. At this time, at least part of densities that are assumed to be obtained by a pixel line of the abnormal nozzle are distributed to pixels on a pixel line of a neighboring nozzle that is located in close proximity to the abnormal nozzle and in which no ejection failure has occurred so that in the halftone image data, at least in part of tones, the pixel on the pixel line of the abnormal nozzle has a density.

18 Claims, 18 Drawing Sheets

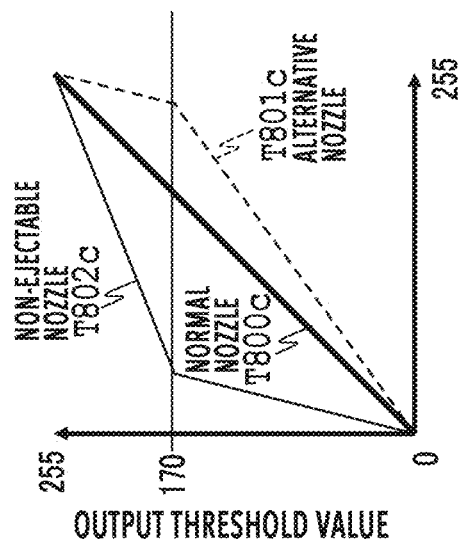
FIG. 8B
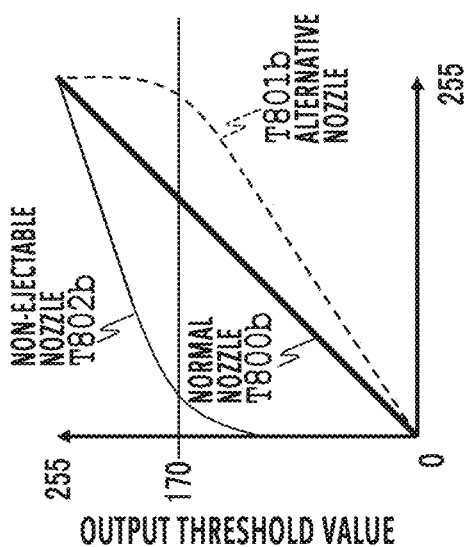
FIG. 8A
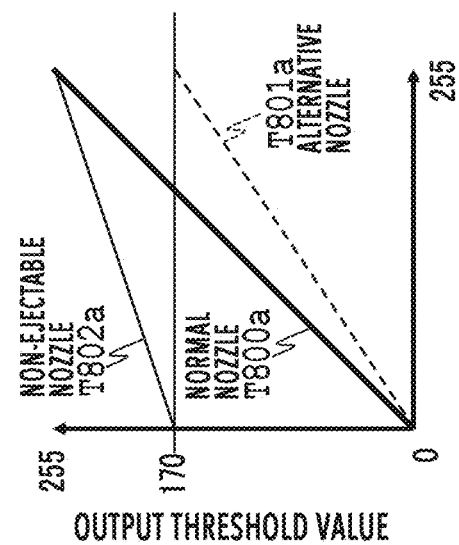
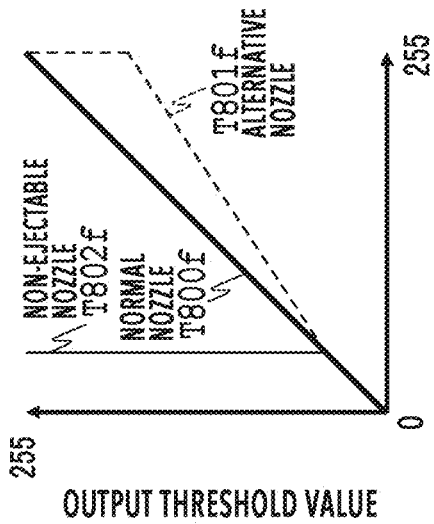
FIG. 8C
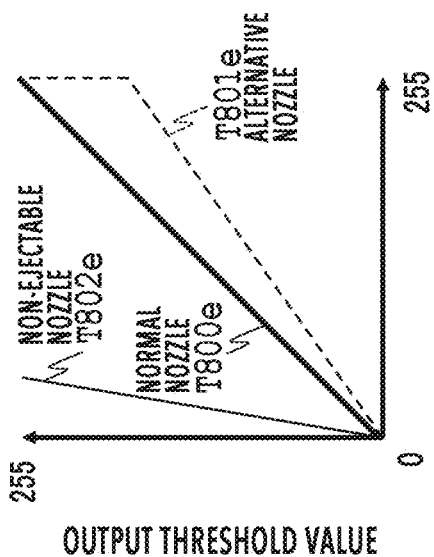
FIG. 8E
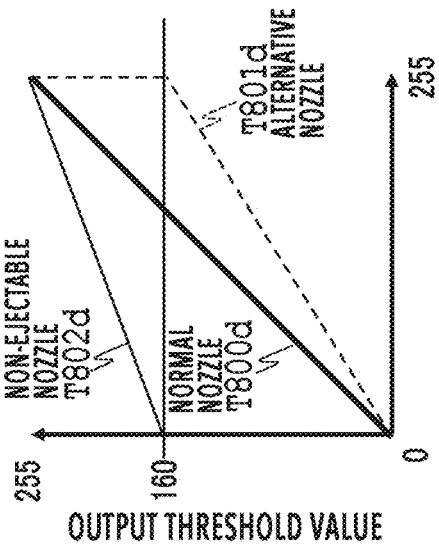
FIG. 8D / FIG. 8F

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | 252 | 202 | 45 | 116 | 84 | 229 | 41 | 105 | 59 | 27 | 208 | 240 | 7 | 148 | 224 | 31 |
| | 99 | 6 | 142 | 206 | 18 | 189 | 151 | 255 | 199 | 90 | 145 | 80 | 53 | 204 | 107 | 179 |
| | 165 | 214 | 65 | 168 | 102 | 137 | 70 | 10 | 117 | 181 | 22 | 159 | 231 | 123 | 15 | 71 |
| | 48 | 120 | 235 | 30 | 242 | 44 | 212 | 146 | 221 | 49 | 247 | 97 | 38 | 160 | 195 | 237 |
| | 23 | 152 | 87 | 184 | 127 | 94 | 172 | 36 | 75 | 109 | 170 | 132 | 216 | 64 | 86 | 140 |
| | 190 | 226 | 14 | 58 | 201 | 1 | 250 | 114 | 191 | 227 | 13 | 57 | 200 | 4 | 251 | 113 |
| | 76 | 110 | 171 | 133 | 217 | 63 | 85 | 141 | 24 | 153 | 88 | 185 | 127 | 93 | 173 | 35 |
| | 220 | 50 | 246 | 98 | 37 | 161 | 194 | 236 | 47 | 119 | 234 | 29 | 243 | 43 | 213 | 147 |
| | 118 | 180 | 21 | 158 | 230 | 124 | 16 | 72 | 164 | 215 | 66 | 169 | 101 | 136 | 69 | 9 |
| | 198 | 89 | 144 | 79 | 54 | 205 | 108 | 178 | 100 | 5 | 143 | 207 | 17 | 188 | 150 | 254 |
| | 60 | 28 | 209 | 241 | 8 | 149 | 225 | 32 | 253 | 203 | 46 | 115 | 83 | 228 | 42 | 106 |
| | 233 | 174 | 122 | 91 | 187 | 73 | 128 | 61 | 135 | 77 | 176 | 239 | 155 | 25 | 125 | 166 |
| | 2 | 139 | 56 | 40 | 162 | 248 | 20 | 197 | 157 | 34 | 112 | 12 | 67 | 210 | 183 | 82 |
| | 96 | 245 | 193 | 219 | 130 | 103 | 52 | 222 | 95 | 244 | 192 | 218 | 131 | 104 | 51 | 223 |
| | 156 | 33 | 111 | 11 | 68 | 211 | 182 | 81 | 3 | 138 | 55 | 39 | 163 | 249 | 19 | 196 |
| | 134 | 78 | 177 | 238 | 154 | 26 | 126 | 167 | 232 | 175 | 121 | 92 | 186 | 74 | 129 | 62 |

FIG.10A

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | 252 | 202 | 45 | 116 | 84 | 229 | 27 | 205 | 39 | 27 | 208 | 240 | 7 | 148 | 224 | 31 |
| | 99 | 6 | 142 | 206 | 18 | 189 | 100 | 255 | 132 | 90 | 145 | 80 | 53 | 204 | 107 | 179 |
| | 165 | 214 | 65 | 168 | 102 | 137 | 46 | 173 | 78 | 181 | 22 | 159 | 231 | 123 | 15 | 71 |
| | 48 | 120 | 235 | 30 | 242 | 44 | 141 | 218 | 147 | 49 | 247 | 97 | 38 | 160 | 195 | 237 |
| | 23 | 152 | 87 | 184 | 127 | 94 | 114 | 182 | 50 | 109 | 170 | 132 | 216 | 64 | 86 | 140 |
| | 190 | 226 | 14 | 58 | 201 | 1 | 166 | 208 | 127 | 227 | 13 | 57 | 200 | 4 | 251 | 113 |
| | 76 | 110 | 171 | 133 | 217 | 63 | 56 | 217 | 16 | 153 | 88 | 185 | 127 | 93 | 173 | 35 |
| | 220 | 50 | 246 | 98 | 37 | 161 | 129 | 248 | 31 | 119 | 234 | 29 | 243 | 43 | 213 | 147 |
| | 118 | 180 | 21 | 158 | 230 | 124 | 10 | 194 | 109 | 215 | 66 | 169 | 101 | 136 | 69 | 9 |
| | 198 | 89 | 144 | 79 | 54 | 205 | 72 | 229 | 66 | 5 | 143 | 207 | 17 | 188 | 150 | 254 |
| | 60 | 28 | 209 | 241 | 8 | 149 | 150 | 180 | 168 | 203 | 46 | 115 | 83 | 228 | 42 | 106 |
| | 233 | 174 | 122 | 91 | 187 | 73 | 85 | 190 | 90 | 77 | 176 | 239 | 155 | 25 | 125 | 166 |
| | 2 | 139 | 56 | 40 | 162 | 248 | 13 | 235 | 104 | 34 | 112 | 12 | 67 | 210 | 183 | 82 |
| | 96 | 245 | 193 | 219 | 130 | 103 | 34 | 244 | 63 | 244 | 192 | 218 | 131 | 104 | 51 | 223 |
| | 156 | 33 | 111 | 11 | 68 | 211 | 121 | 197 | 2 | 138 | 55 | 39 | 163 | 249 | 19 | 196 |
| | 134 | 78 | 177 | 238 | 154 | 26 | 84 | 225 | 154 | 175 | 121 | 92 | 186 | 74 | 129 | 62 |

FIG.10B

| PATCH NUMBER i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| PIXEL VALUE ON PIXEL LINE OF SIMULATED NON-EJECTABLE NOZZLE | 0 | 0 | 0 | 0 | 0 | 0 | 0 | 0 | 32 | 64 | 96 | 128 | 160 | 192 | 224 | 255 |
| PIXEL VALUE ON PIXEL LINES OF OTHER NOZZLES | 32 | 64 | 96 | 128 | 160 | 192 | 224 | 255 | 255 | 255 | 255 | 255 | 255 | 255 | 255 | 255 |

IMAGE PROCESSING APPARATUS, IMAGE FORMING SYSTEM, IMAGE PROCESSING METHOD AND STORAGE MEDIUM

BACKGROUND OF THE INVENTION

Field of the Invention

The present disclosure relates to a technique to complement a non-ejectable nozzle.

Description of the Related Art

Conventionally, an ink jet printing apparatus is used that forms a desired image on a printing medium by ejecting ink droplets from each individual nozzle while relatively moving a print head having a nozzle column in which a plurality of ink ejection ports (nozzles) is arrayed and the printing medium.

In the ink jet printing apparatus, there is a case where a nozzle that becomes unable to eject ink (hereinafter, called "non-ejectable nozzle") during image formation occurs suddenly. Further, there is a case where a nozzle in which an abnormality has occurred, such as that the ink landing position error has become large to exceed a permissible value, is made forcibly unusable and handled as a non-ejectable nozzle.

The sudden ejection failure as described above is frequently caused by foreign matter in close proximity to the nozzle, bubbles having entered the inside of the nozzle, and the like. Consequently, in almost all cases, it is possible to solve the ejection failure by maintenance processing for the print head.

However, in a case where printing is performed on a continuous sheet (roll sheet) or in a case where printing is performed continuously even though the sheets are cut sheets, importance is given to high speed of the output, and therefore, it is not realistic to perform maintenance processing frequently, which requires a comparatively long time. In this regard, it is also performed to suppress trouble on an image, such as streak and unevenness, which results from a non-ejectable nozzle, by so-called non-ejection complementation processing to eject ink droplets to be ejected by the non-ejectable nozzle by another nozzle. For example, Japanese Patent Laid-Open No. 2012-71474 has disclosed a method of generating image data modified so as to compensate for the output of a non-ejectable nozzle by an alternative nozzle other than the non-ejectable nozzle. At this time, for the nozzle in which an ejection failure has occurred, in order to avoid trouble, ejection disabling processing to forcibly bring the nozzle into an unusable state so that the nozzle is not used for image formation is performed.

There is a case where the above-described ejection failure recovers naturally during image formation even though maintenance processing is not performed in particular. In such a case, on a condition that ejection disabling processing is performed for the nozzle in which an ejection failure has occurred so that the nozzle cannot be used at all as described above, the chance for the nozzle to recover naturally as a normal nozzle is lost.

The present disclosure has been made in view of the above-described problem and an object thereof is to implement non-ejection complementation processing that allows a nozzle in which an ejection failure has occurred to recover as a normal nozzle.

SUMMARY OF THE INVENTION

The image processing apparatus according to the present disclosure is an image processing apparatus that generates halftone image data used by an image forming apparatus that forms an image on a printing medium by a print head including a nozzle column in which a plurality of nozzles is arrayed ejecting ink from the nozzles while relatively moving the printing medium in a direction perpendicular to the nozzle column, and includes: an acquisition unit configured to acquire positional information for specifying an abnormal nozzle in which an ejection failure has occurred among the plurality of nozzles; and a conversion unit configured to convert, based on the positional information, multi-valued input image data into the halftone image data so that (i) at least part of densities that are assumed to be obtained by a pixel line of the abnormal nozzle are distributed to pixels on a pixel line of a neighboring nozzle that is located in close proximity to the abnormal nozzle and in which no ejection failure has occurred and (ii) in the halftone image data, at least in part of tones, a pixel on the pixel line of the abnormal nozzle has a density.

Further features of the present invention will become apparent from the following description of exemplary embodiments with reference to the attached drawings.

BRIEF DESCRIPTION OF THE DRAWINGS

FIG. 6A is a diagram showing an example of input image data and FIG. 6B is a diagram showing an example of input image data after non-ejection complementation processing is performed;

FIG. 8A to FIG. 8F are each a diagram showing an example of correction information in an LUT format according to the second embodiment;

FIG. 10A is a diagram showing an example of a threshold value matrix and FIG. 10B is a diagram showing an example of a threshold value matrix after non-ejection complementation processing is performed;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (Hardware Configuration of Image Forming System)

Figure 1:
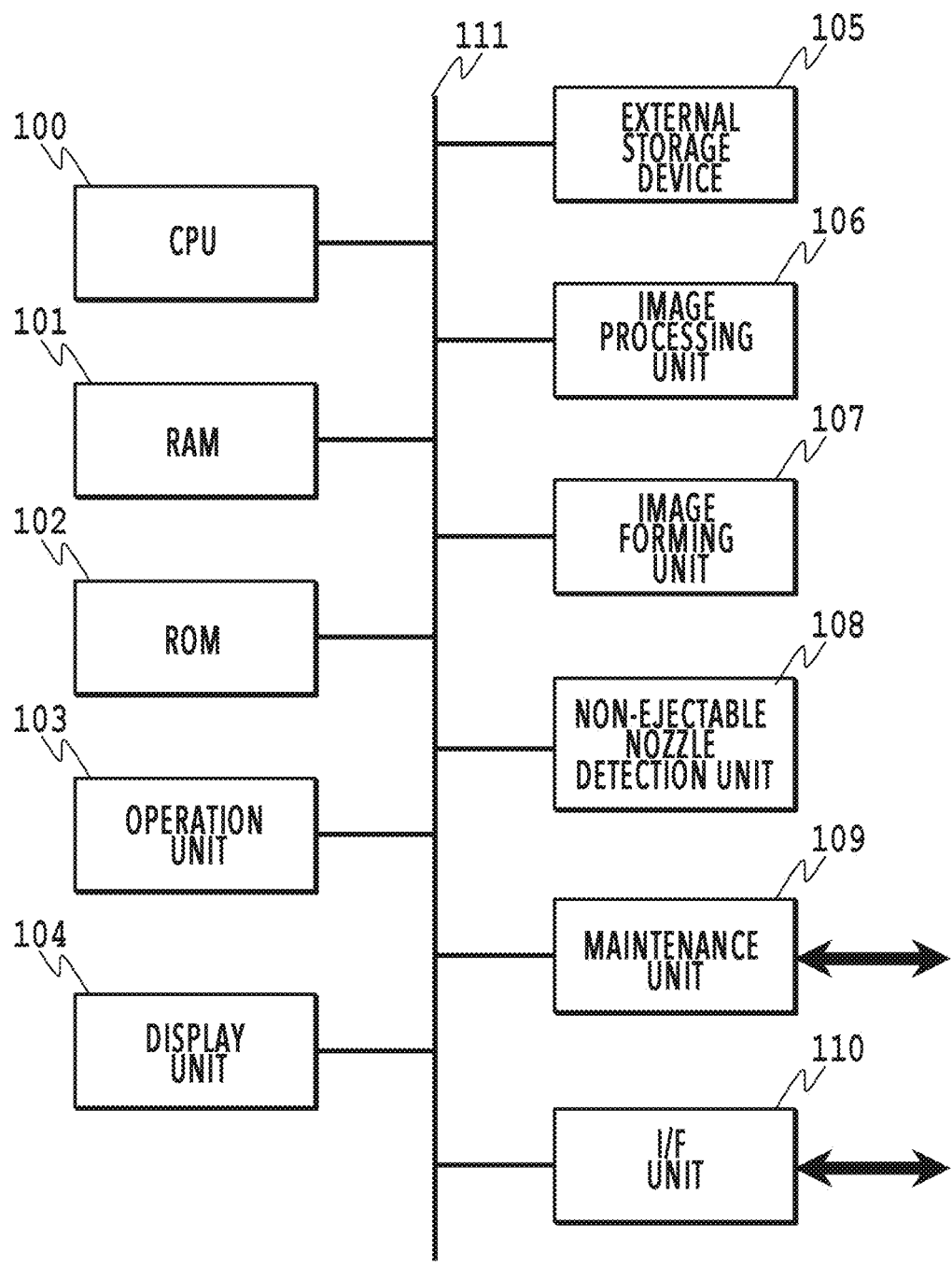
FIG. 1 is a diagram showing a hardware configuration of an image forming system.

FIG. 1 is a diagram showing a hardware configuration of an image forming system including an image processing apparatus according to a first embodiment. In the present embodiment, as the image processing apparatus, an image processing controller is explained as an example thereof, which is incorporated within the image forming system forming an image on a printing medium by using a printing material.

The image forming system comprises a CPU 100, a RAM 101, a ROM 102, an operation unit 103, a display unit 104, an external storage device 105, an image processing unit 106, an image forming unit 107, a non-ejectable nozzle detection unit 108, a maintenance unit 109, an I/F (interface) unit 110, and a bus 111.

The CPU (Central Processing Unit) 100 controls the operation of the entire image forming system by using input data and computer programs stored in the RAM and the ROM, to be described later. Here, a case where the CPU 100 controls the entire image forming system is explained as an example, but it may also be possible to control the entire image forming system by a plurality of pieces of hardware sharing processing.

The RAM (Random Access Memory) 101 temporarily stores computer programs and data read from the external storage device 105 and data received from the outside via the I/F unit 110. Further, the RAM 101 is used as a storage area used in a case were the CPU 100 performs various kinds of processing and as a storage area used in a case where the image processing unit 106 performs image processing. That is, it is possible for the RAM 101 to appropriately provide various storage areas. The ROM (Read Only Memory) 102 stores setting parameters that are set in each unit in the image forming system, a boot program and the like.

The operation unit 103 is an input device, such as a keyboard and a mouse, and receives an operation (instructions) by an operator. That is, it is possible for an operator to input various instructions to the CPU 100 via the operation unit 103. The display unit 104 is a display device, such as a CRT (Cathode Ray Tube) and an LCD (Liquid Crystal Display), and is capable of displaying processing results by the CPU 100 by images, characters and the like. In a case where the display unit 104 is a touch panel capable of detecting a touch operation, it may also be possible for the display unit 104 to function as part of the operation unit 103.

The external storage device 105 is a large-capacity information storage device represented by a hard disk drive. In the external storage device 105, the OS (Operating System) and computer programs, data and the like for causing the CPU 100 to perform various kinds of processing are saved. Further, the external storage device 105 stores temporary data (for example, image data that is input and output, threshold value matrix used in the image processing unit 106, positional information on non-ejectable nozzle, correction information on non-electable nozzle and alternative nozzle and the like) generated by the processing of each unit. The computer programs and data stored in the external storage device 105 are read appropriately in accordance with the control by the CPU 100 and stored in the RAM 101 to be the processing target by the CPU 100.

The image processing unit 106 is implemented as a processor capable of executing computer programs or a dedicated image processing circuit and performs various kinds of image processing for converting image data that is input as a printing target into image data that can be output by the image forming unit 107. For example, in a case of receiving instructions to perform image processing from the CPU 100, the image processing unit 106 performs quantization processing for digital image data of N tones (N: natural number) input from the external storage device 105 and outputs image data (halftone image data) quantized into M tones (M: natural number, N>M).

Figure 2:
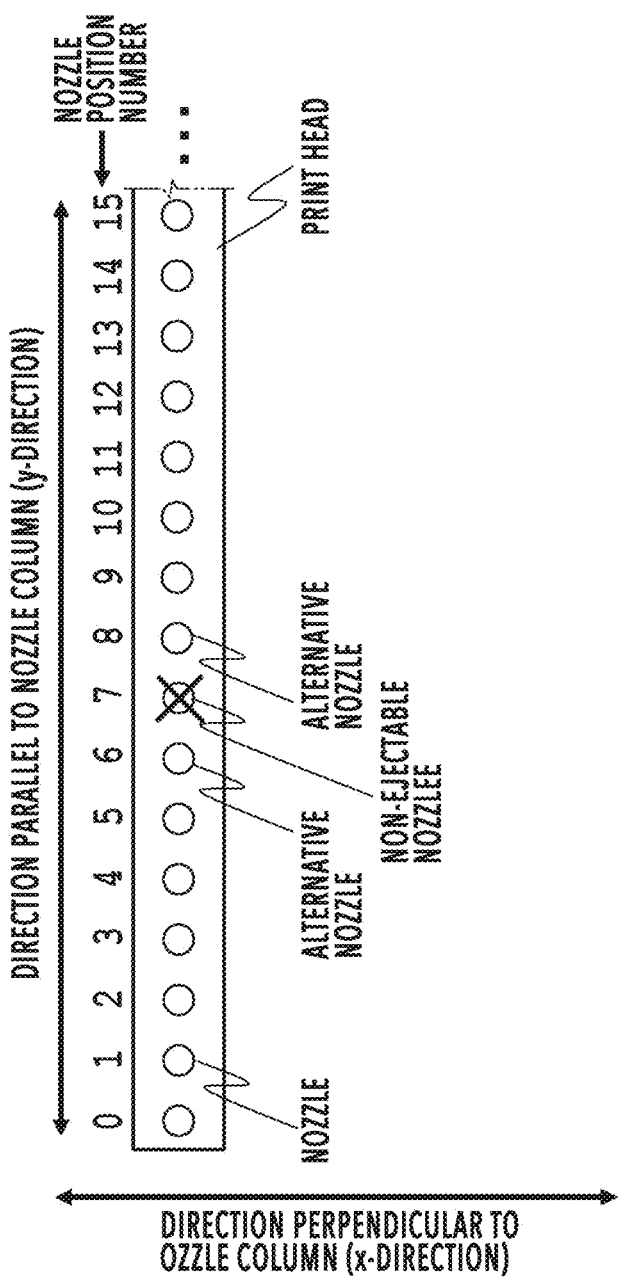
FIG. 2 is a diagram showing a configuration example of a print head.

The image forming unit 107 forms an image on a printing medium by using ink as a printing material based on the halftone image data received from the image processing unit 106. The image forming unit 107 adopts the ink jet method of forming an image by ejecting ink onto a printing medium from nozzles. The print head comprised by the image forming unit 107 has nozzle columns (printing element columns) corresponding to the number of ink colors, in which a plurality of nozzles (printing elements) capable of ejecting ink is arrayed. FIG. 2 is a diagram showing a configuration example of the print head. In a case of an image forming system compatible with color printing, the print head typically mounts tour nozzle columns corresponding to each ink of cyan (C), magenta (M), yellow (Y), and black (K), in FIG. 2, for simplification of explanation, only the nozzle column of black (K) is shown schematically. The print head shown in FIG. 2 is a long line head that covers the entire width of the drawing area in the direction parallel to the nozzle column (y-direction). The image forming unit 107 generates a drive signal for controlling the print head based on halftone image data. The print head forms an image on a printing medium by ejecting ink droplets to generate dots while relatively moving the printing medium in the direction perpendicular to the nozzle column (x-direction), which is perpendicular to the direction parallel to the nozzle column, based on the drive signal. In the present embodiment, an example of a case where the nozzle whose nozzle position number is 7 becomes a non-ejectable nozzle is explained. Further, in the present embodiment, the neighboring nozzles whose nozzle position numbers are 6 and 8, which are adjacent to the No. 7 nozzle, are taken to be alternative nozzles (hereinafter, called "alternative nozzles") for complementing the dots (densities corresponding to the dots) to be formed by the No. 7 non-ejectable nozzle.

The non-ejectable nozzle detection unit 108 captures the printing medium output from the image forming unit 107 and acquires information on the image formed on the printing medium. The non-ejectable nozzle detection unit 108 comprises an image sensor (line sensor or area sensor) as an image capturing unit (image reading unit) and has a function to specify the non-ejectable nozzle position by analyzing the acquired captured image. It may also be possible for the image sensor to use an in-line scanner, an offline scanner or the like, not shown schematically, which the image forming system mounts.

The maintenance unit 109 performs cleaning processing to remove nozzle clogging of the print head comprised by the image forming unit 107. As the cleaning processing, for example, there is a method of moving the print head up to a position at which an absorber (sponge and the like) of waste ink exists and causing a predetermined amount of ink to be ejected forcibly from each nozzle within the nozzle column. Further, there is a method of forcibly pushing out ink by applying pressure to the ink from the side of the ink tank. Alternatively, there is a method of removing clogging by forcibly sucking in ink by applying a negative pressure from the outside of the nozzle. It is assumed that the printer of the present embodiment comprises an automatic cleaning mechanism by one of the methods described above.

The I/F unit 110 functions as an interface for connecting the image forming system and an external device. Further, the I/F unit 110 also functions as an interface for performing transmission and reception of data with a communication device by using infrared communication, a wireless LAN (Local Area Network) and the like, and an interface for connecting to the internet. Each unit described above is connected to the bus 111 and capable of performing transmission and reception of data via the bus 111.

(Function Configuration of Image Processing Unit)

Figure 3:
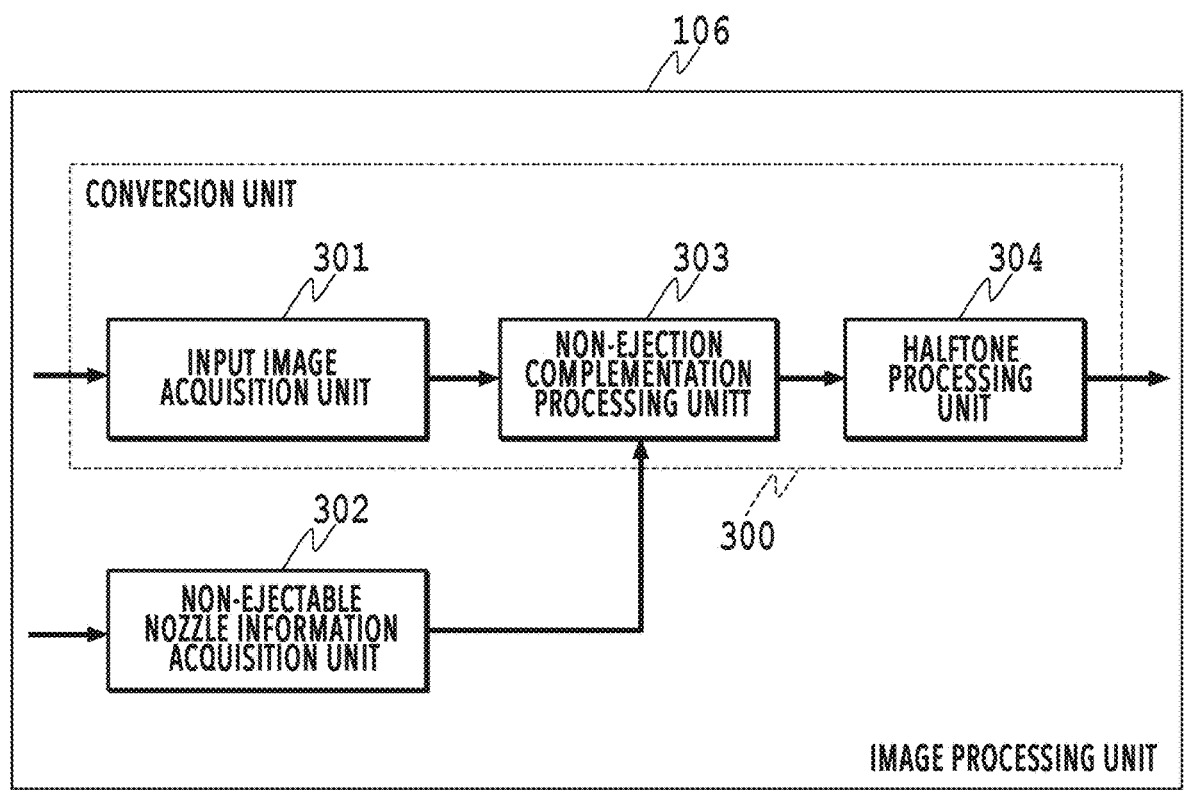
FIG. 3 is a block diagram showing a function configuration of an image processing unit according to a first embodiment.

Next, with reference to the block diagram shown in FIG. 3, the function configuration of the image processing unit 106 according to the present embodiment is explained. The image processing unit 106 generates halftone image data whose number of tones has been reduced from that of the input digital image data (hereinafter, referred to as "input image data").

As shown in FIG. 3, the image processing unit 106 has a conversion unit 300 and a non-ejectable nozzle information acquisition unit 302. The conversion unit 300 further has an input image acquisition unit 301, a non-ejection complementation processing unit 303, and a halftone processing unit 304 and converts input image data into halftone image data based on non-ejectable nozzle positional information. The image processing unit 106 is implemented as a dedicated image processing circuit configuring the block diagram shown in FIG. 3.

The input image acquisition unit 301 acquires printing-target input image data that is input to the image forming system. For example, it is assumed that the specifications of the image forming unit 107 are those that implement an output resolution of 1,200 dpi by using inks of four colors of cyan (C), magenta (M), yellow (Y), and black (K). In this case, the input image data is image data whose resolution of each color of CMYK is 1,200 dpi and which has the number of tones corresponding to eight bits (256 tones). For each pixel in the image data of each of CMYK, the pixel value in accordance with the density that is desired to be represented is stored. There may be a case where the printing-target input image data has a combination of colors different from CMYK or an image resolution other than 1,200 dpi. In this case, it is sufficient for the input image acquisition unit 301 to acquire image data after being converted into a format that can be handled by the image forming unit 17 by performing preprocessing, such as color conversion and resolution conversion.

The non-ejectable nozzle information acquisition unit 302 acquires positional information capable of specifying a non-ejectable nozzle within the nozzle column (hereinafter, called "non-ejectable nozzle information"), which is detected and stored in advance, from the RAM 101 or the external storage device 105. Here, it is assumed that the "non-ejectable nozzle" includes a nozzle in which an abnormality, such as that the ink landing position error increases and exceeds a permissible value, has occurred, in addition to a nozzle that is no longer capable of ejecting ink. That is, in the present specification, the "non-ejectable nozzle" is used as the term referring to a nozzle that is not normal (abnormal nozzle) in which some ejection failure has occurred. Then, in the non-ejectable nozzle information, to which pixel line (pixel group extending in the direction perpendicular to the nozzle column) of the input image data, a nozzle unable to eject ink correctly due to clogging of the nozzle, a failure in the element and the like corresponds is indicated by the above-described nozzle position number. By this non-ejectable nozzle information, it is made possible to specify the pixel line unable to form a dot in the image forming unit 107. The non-ejectable nozzle information is obtained in advance by a publicly known method. As a publicly known method, for example, there is a method of specifying the position of the nozzle unable to eject ink by outputting in advance a non-ejection position detection chart image and analyzing the output results thereof.

The non-ejection complementation processing unit 303 performs non-ejection complementation processing (also called "density complementation processing") to complement the density that should be assumed to be obtained by the non-ejectable nozzle specified by the non-ejectable nozzle information by another nozzle. In the non-ejection complementation processing of the present embodiment, control is performed so that the chance for a non-ejectable nozzle to recover naturally as s normal nozzle is secured while suppressing image quality deterioration due to the non-ejectable nozzle. Specifically, by using correction information created in advance for the non-ejectable nozzle and the alternative nozzle, the input image data is corrected in accordance with the positions of the non-ejectable nozzle and the alternative nozzle. The correction information is created in advance in the lookup table (LUT) format indicating the relationship between the input pixel value and the output pixel value or in the function format and stored in the RAM 101 or the external storage device 105. Details of the correction information will be described later.

The halftone processing unit 304 generates halftone image data by performing conversion processing into the number of tones that the image forming unit 107 can represent for the input image data for which the non-ejection complementation processing has been performed. This conversion processing can also be said as processing to determine arrangement of dots formed by each nozzle within the nozzle column. Specifically, input image data in which each pixel is represented by eight bits is converted into 1-bit binary halftone image data in which each pixel has a value of "0" or "1". In the halftone image data, the pixel whose pixel value (output pixel value) is "0" indicates off of the dot and the pixel whose pixel value is "1" indicates on of the dot. Then, it can be said that the halftone image data such as this represents the input image data in a pseudo manner by the number of tones smaller than the number of tones of the input image data. In the present embodiment, it is possible to apply the error diffusion processing, the dither processing and the like, which are publicly known methods, as the halftone processing.

(Details of Correction Information)

Figure 4A:
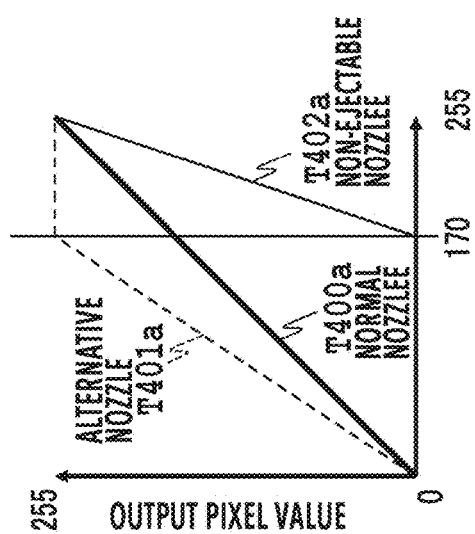
FIG. 4A to FIG. 4F are each a diagram showing an example of correction information in an LUT format according to the first embodiment.

Following the above, correction information used in the non-ejection complementation processing unit 303 is explained in detail. FIG. 4A to FIG. 4F each show an example of correction information in the LUT format, which can be applied to the present embodiment. In each LUT in FIG. 4A to FIG. 4F, the relationship between the input pixel value and the output pixel value, which corresponds to the non-ejectable nozzle, is indicated by each of thin solid lines T402a to T402f and the relationship between the input pixel value and the output pixel value, which corresponds to the alternative nozzle, is indicated by each of dotted lines T401a to T401f. In addition, for comparison, the relationship between the input pixel value and the output pixel value, which corresponds to the normal nozzle that is not the correction target (nozzle except for neighboring nozzle among all the normal nozzles), is indicated by each of thick solid lines T400a to T400f. In the present embodiment, FIG. 4A is used.

First, the correction information in the LUT format shown in FIG. 4A is explained in detail. In a case of the basic LUT as shown in FIG. 4A, as is obvious from the comparison between the dotted line 401a and the thick solid line T400a, for the alternative nozzle, the correction characteristic is that a density 1.5 times that of the normal nozzle is obtained. Further, from the thin sold line 402a, it is known that for the non-ejectable nozzle, the correction characteristic is that the output is not performed until the input tone value becomes a tone value (here, 170) 1/1.5 times that of the maximum value (here, 255). That is, in a case of the LUT in FIG. 4A, the pixel values on the pixel line corresponding to the non-ejectable nozzle are corrected so that the non-ejectable nozzle is not driven at the tone values (here, less than 170) for which dot complementation by the alternative nozzle is possible. Specifically, in a case where the input pixel value of the pixel at the position corresponding to the non-ejectable nozzle is between "0" and "170", the correction is performed so that the output pixel value is "0". On the other hand, for the pixels on the pixel line corresponding to the alternative nozzle, the correction is performed so that the pixel values of the pixels on the pixel line corresponding to the non-ejectable nozzle before the correction are proportionally divided and added (here, halved and added).

As above, to the pixels on the pixel line corresponding to the alternative nozzle, the densities to be assumed by the pixels on the pixel line corresponding to the non-ejectable nozzle are distributed. Then, accompanying this distribution, in each pixel on the pixel line of the alternative nozzle, in a case where the input pixel value of the pixel is a predetermined value (here, "170"), the output pixel value is "255", which is the maximum value. By the correction such as this, by the two alternative nozzles adjacent to the non-ejectable nozzle, the dots (densities corresponding to the dots) to be formed by the non-ejectable nozzle are complemented. Further, in each pixel on the pixel lines corresponding to the alternative nozzles, in a case where the input pixel value of the pixel is larger than or equal to "171" and less than "255", the correction is performed so that the output pixel value of the pixel is "255", which is the maximum value. Then, for each pixel on the pixel line of the non-ejectable nozzle, the correction is performed so that the amount that cannot be added (for example, in a case were the value after the addition is "260", the amount corresponding to "5" by which "255" is exceeded) in a case where the above-described correction is performed for the pixel lines of the alternative nozzles is taken to be the output pixel value thereof. That is, on the pixel lines corresponding to the alternative nozzles, as a result of non-ejection complementation, the output pixel value takes the maximum value in a case where the input pixel value is "170", and therefore, for the non-ejectable nozzle, the correction is performed so that the output pixel value takes a value between "0 and 255" in the range in which the input pixel value exceeds "170". That is, in a case where the density of the pixel on the pixel line of the non-ejectable nozzle is high (pixel value is 171 or lamer), even for the pixel on the pixel line corresponding to the non-electable nozzle, the correction is performed so that the pixel has a density (pixel value is 1 or larger). Due to this, in the tone range that cannot be complemented by the alternative nozzle (input pixel value: 170 or larger), it is possible to control the output density by the non-ejectable nozzle so that the tones are continuous. Of course, in the non-ejectable nozzle, an ejection failure of ink has occurred as described above. However, by the non-ejection complementation using, the correction information in FIG. 4A, the drive in accordance with the output pixel value is performed also for the non-ejectable nozzle in the high-density area. As a result of that, for example, even in a case where the non-ejectable nozzle is unable to eject ink, there is a possibility that the ejection of ink recovers naturally by the drive control. Further, after a long-term period of time during which ejection of ink by a non-ejectable nozzle is terminated, there is a case where the viscosity of ink within the non-ejectable nozzle increases, and therefore, it may happen that a phenomenon occurs in which non-ejection is not recovered even by performing maintenance. In contrast to this, by controlling also the non-ejectable nozzle while complementing the non-ejectable nozzle by the alternative nozzles, it is possible to suppress an increase in the viscosity of ink. Further, this is the same also in a case where a nozzle is detected as a non-ejectable nozzle because the ink landing position error is large. The neighboring alternative nozzle ejects ink so as to obtain a solidly printed area, and therefore, even in a case where ink is ejected onto a position at which the ink landing position error is large, the deterioration of the image quality is not conspicuous and it is possible to suppress an increase in the viscosity of ink.

Further, the average of the thin solid line T402a of the non-ejectable nozzle and the dotted line 401a of the alternative nozzle is equal to T400a of the normal nozzle. Due to this, the total number of dots formed by the non-ejectable nozzle and the alternative nozzles is equal before and after the correction. Because of this, even in a case where the non-ejectable nozzle naturally recovers suddenly, it is possible to obtain an image for which non-ejection has been complemented and whose tone characteristic is good.

Figure 4B:
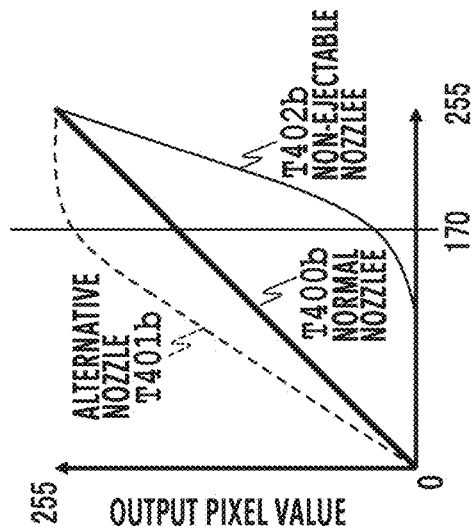
Figure 4C:
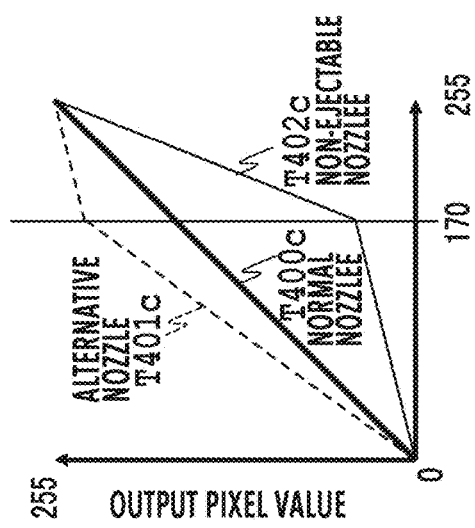

Here, what is obtained by partially changing the basic LUT shown in FIG. 4A described above is LUTs shown in FIG. 4B to FIG. 4F. First, the LUTs shown in FIG. 4B and FIG. 4C are LUTs having the characteristic that an attempt is made to drive the non-ejectable nozzle also in the density area before reaching the density that cannot be complemented by the alternative nozzle. In the LUT shown in FIG. 4B, compared to the LUT in FIG. 4A, the change in the slope of the segment indicating the correction characteristic of the non-ejectable nozzle and the alternative nozzle is smooth. Using the LUT shown in FIG. 4B makes it possible to obtain an image for which non-ejection has been complemented and whose continuity of tone is smooth compared to a case where the LUT in FIG. 4A is used on a condition that the non-ejectable nozzle recovers naturally. Further, the LUT shown in FIG. 4C is changed so as to make an attempt to perform ejection by the non-ejectable nozzle also in the density area whose tone value is less than or equal to "170" for part of the densities to be reproduced by the non-ejectable nozzle. In this case, compared to the LUT in FIG. 4A, the effect of correction of streak, unevenness and the like on an image due to the non-ejectable nozzle is reduced, but it is possible to secure more chances for the non-ejectable nozzle to recover naturally.

Figure 4D:
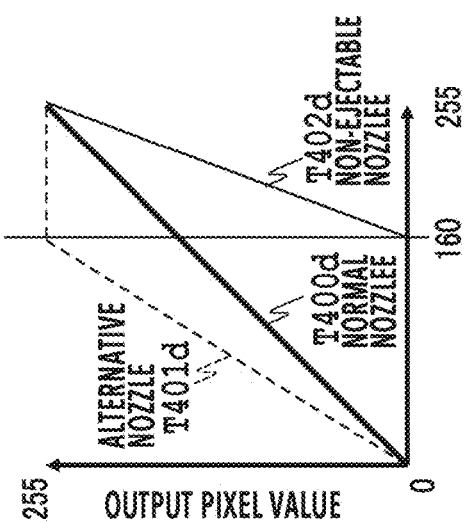

Further, the LUT shown in FIG. 4D is an LUT having the correction characteristic that it is made possible to obtain a higher density for the alternative nozzle. The trouble on an image, such as streak and unevenness, due to the non-ejectable nozzle is different depending on the dot diameter and the sheet type, and therefore, it is sufficient to set the correction ratio for the alternative nozzle so that the trouble is reduced. With the LUT shown in FIG. 4D, as indicated by the dotted line T401d, density 1.6 times that in a case of the normal nozzle is obtained for the alternative nozzle. Then, as indicated by the thin solid line T402d, for the non-ejectable nozzle, the pixel values are corrected so that the ink ejection operation is not performed until the input tone value reaches a tone value (here, 160) 1/1.6 times the maximum value (here, 255). In a case where the appropriate correction amount is different for each tone, it is sufficient to set an appropriate correction ratio for each tone so that the above-described trouble is reduced.

In a case where the non-ejection complementation processing using the LUT shown in FIG. 4A to FIG. 4D explained so far is performed, for the alternative nozzle, the number of times of drive of the nozzle increases compared to that at the normal time and for the non-ejectable nozzle, the number of times of drive of the nozzle decreases compared to that at the normal time. Then, the pixel values on the pixel line corresponding to the non-ejectable nozzle are corrected so that the non-ejectable nozzle is driven at least in part of the density area. In the darkest portion (input pixel value: 255) within the input image data, it is not possible to complement the dots to be formed by the non-ejectable nozzle by forming dots by the alternative nozzle. Because of this, for the darkest portion within the input image data, it is desirable to set the output pixel value to the maximum value (here, 255) irrespective of nozzle so that the drive substantially the same as that of the normal nozzle is performed also for the non-ejectable nozzle.

As above, in a case of the LUT shown in FIG. 4A to FIG. 4D, for the input pixel values from the bright tone to the intermediate tone, the pixels corresponding to the alternative nozzle are caused to assume part of the densities to be assumed by the pixels corresponding to the non-ejectable nozzle. Due to this, it is possible to reduce streak and unevenness due to the non-ejectable nozzle. Then, for the input pixel values of the dark tone that cannot be complemented by the alternative nozzle, the correction is performed so as to make an attempt to reproduce the density by the non-ejectable nozzle. Due to this, the chance for the non-ejectable nozzle to recover naturally as a normal nozzle is secured.

Figure 4E:
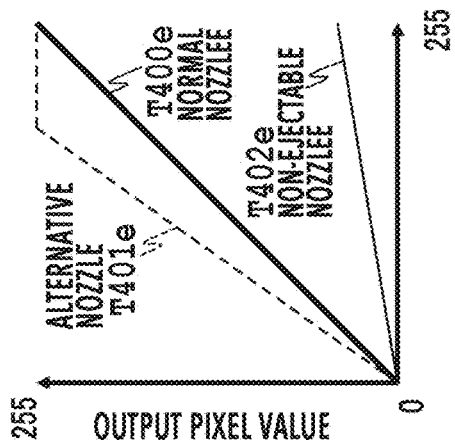
Figure 4F:
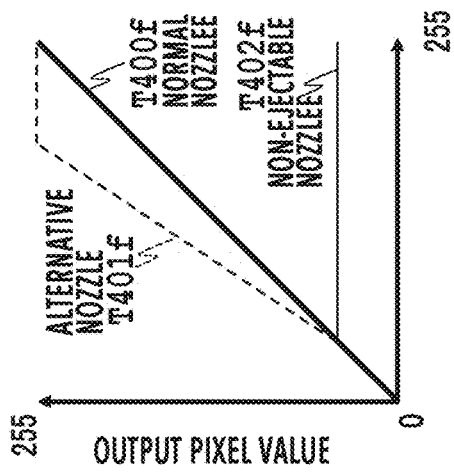

Further, it may also be possible to correct the pixel values so that the drive is also performed for the non-ejectable nozzle to the extent that the image is not affected adversely by using the LUT shown in FIG. 4E or FIG. 4F. In a case where the correction such as this is performed, it is possible to increase the number of chances for the non-ejectable nozzle to recover naturally. In a case of the LUT shown in FIG. 4E, as indicated by the thin solid line T402e, the correction that makes it possible to obtain a density 1/6 times that in a case of the normal nozzle is performed for the non-ejectable nozzle. Then, for the alternative nozzle, as indicated by the dotted line T401e, the correction is performed so that a density 17/12 times that in a case of the normal nozzles is obtained to complement the density reduced by the non-ejectable nozzle. Further, with the LUT shown in FIG. 4F, as indicated by the thin solid line T402f,
the pixel values of the pixels corresponding to the non-ejectable nozzle are corrected so that a uniform density is obtained after a predetermined tone value. The predetermined tone value here is a tone value corresponding to the highlight (bright portion) that is not conspicuous even though non-ejection occurs. Then, for the alternative nozzle, as indicated by the dotted line T401f, the correction is performed so as to complement the density reduced by the non-ejectable nozzle. In a case where the LUT shown in FIG. 4E or FIG. 4F is used in the non-ejection complementation processing, compared to FIG. 4A, the correction effect of streak and unevenness on an image due to the non-ejectable nozzle is reduced, but it is possible to secure more chances for the non-ejectable nozzle to recover naturally.

(Details of Image Processing Unit)

Figure 5:
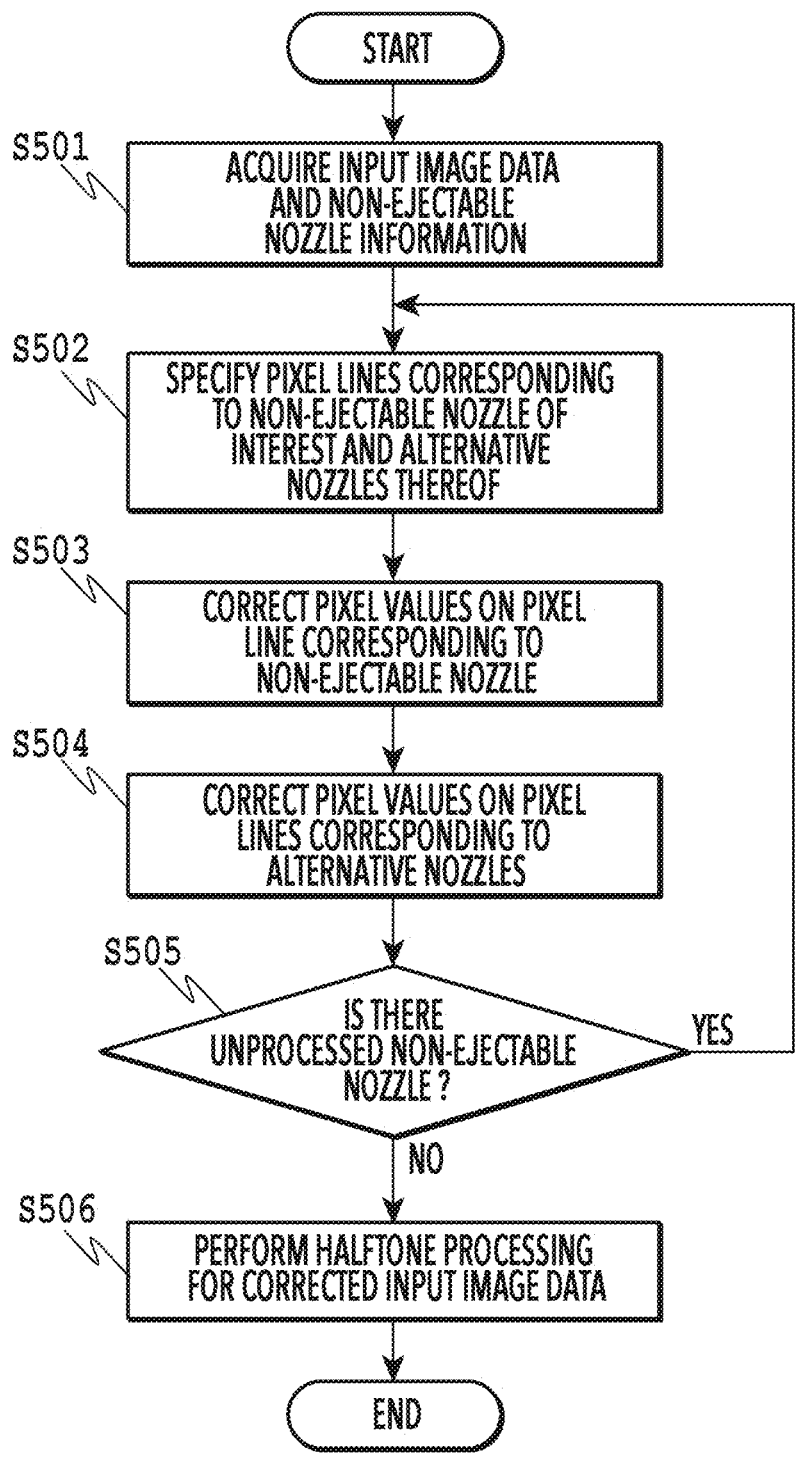
FIG. 5 is a flowchart showing a flow of processing in the image processing unit according to the first embodiment.

Next, a flow of processing in the image processing unit 106 according to the present embodiment is explained in detail with reference to the flowchart shown in FIG. 5. Symbol "S" in explanation of the flowchart indicates a step. This is the same in explanation of the flowcharts in the second and subsequent embodiments.

Figures 6A, 6B:
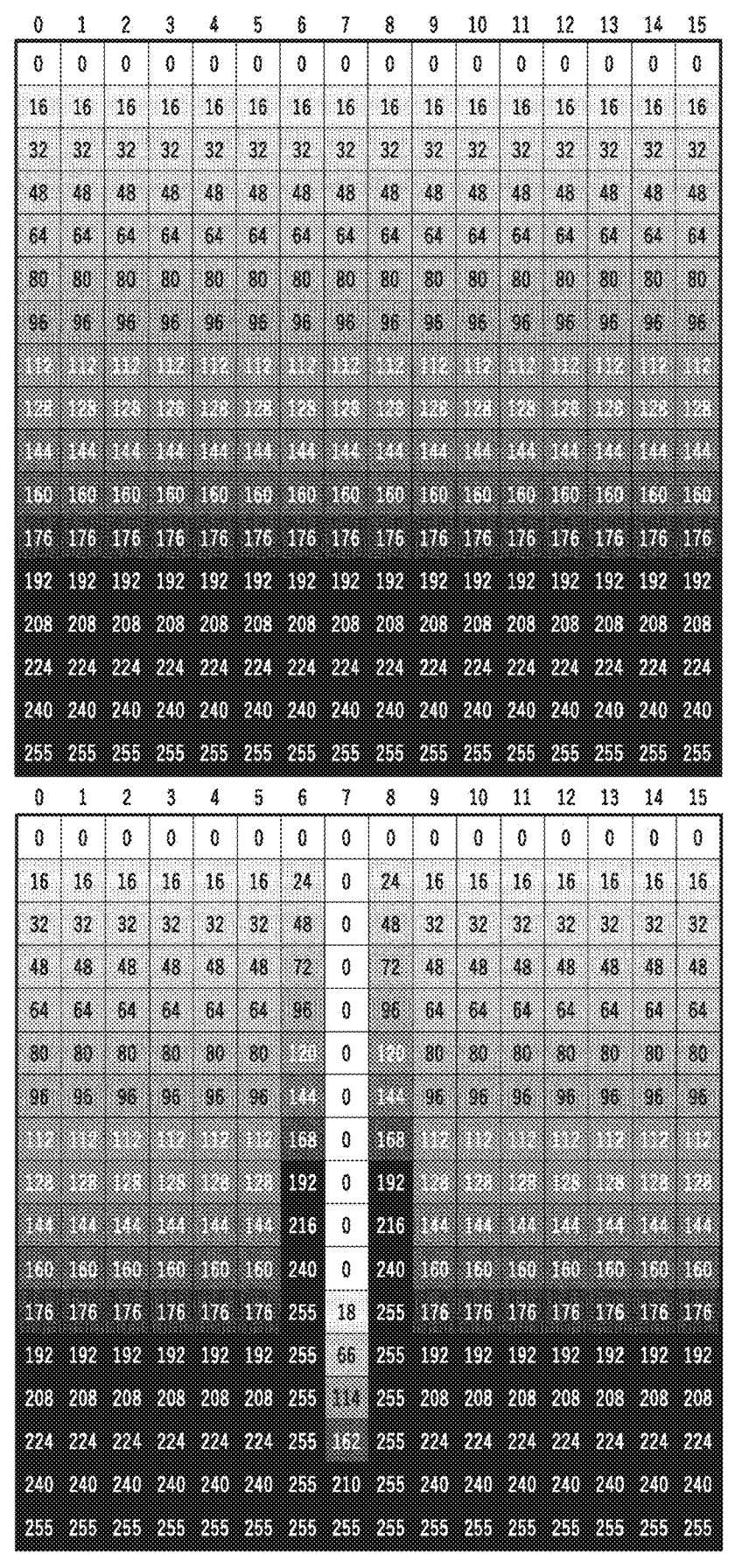

First, at S501, the input image acquisition unit 301 acquires input image data and the non-ejectable nozzle information acquisition unit 302 acquires non-ejectable nozzle information. FIG. 6A shows an example of input image data whose image size is 16 pixels×16 pixels. The numerical value of each pixel within the input image data shown in FIG. 6A indicates a tone value. Figures "0" to "15" attached to the top of the input image data are nozzle position numbers corresponding to the respective pixel lines extending in the direction perpendicular to the nozzle column and it is assumed that the nozzle position numbers match with the nozzle position numbers in the print head shown in FIG. 2 described previously. Further, here, the following explanation is given on the assumption that information specifying the No. 7 nozzle position as the non-ejectable nozzle position is acquired by the non-ejectable nozzle information acquisition unit 302.

Next, at S502, the non-ejection complementation processing unit 303 specifies the pixel lines within the input image data, which correspond to the non-ejectable nozzle of interest among all the non-ejectable nozzles within the target nozzle column and the alternative nozzles thereof, respectively, based on the non-ejectable nozzle information acquired at S501. Here, the non-ejectable nozzle is only the nozzle whose nozzle position number is 7, and therefore, the No. 7 nozzle is the non-ejectable nozzle of interest. Men, the pixel line whose nozzle position number is 7 in the input image data shown in FIG. 6A is specified as the pixel line corresponding to the non-ejectable nozzle of interest. Further, the two pixel lines adjacent to the No. 7 pixel line, that is, both the pixel lines whose nozzle position numbers are 6 and 8 are specified as the pixel lines corresponding to the alternative nozzles.

Next, at S503, the non-ejection complementation processing unit 303 corrects the pixel values on the pixel line corresponding to the non-ejectable nozzle of interest specified at S502 based on the correction information. For example, in a case where the LUT shown in FIG. 4A described above is used as the correction information, the pixel values are corrected based of the thin solid line T402a corresponding to the non-ejectable nozzle.

Next, at S504, the non-ejection complementation processing unit 303 corrects the pixel values on the pixel lines corresponding to the alternative nozzles specified at S502 based on the correction information. For example, in a case where the LUT shown in FIG. 4A described above is used as the correction information at S503, the pixel values are corrected based on the dotted line T401a corresponding to the alternative nozzles.

Next, at S505, whether or not the processing at S502 to S504 described above has been completed for all the non-ejectable nozzles indicated by the non-ejectable nozzle information acquired at S501 is determined. In a case where there is an unprocessed non-ejectable nozzle, the processing returns to S502, and the next non-ejectable nozzle of interest is determined and the pixel value correction processing is continued. On the other hand, in a case where the processing has been completed for all the non-ejectable nozzles, the processing advances to S506. At this time, the input image data for which the non-ejection complementation processing has been performed is sent to the halftone processing unit 304. FIG. 6B shows the image data after the non-ejection complementation processing is performed by using the LUT in FIG. 4A for the input image data shown in FIG. 6 described above. In the image data in FIG. 6B, the density of each pixel on the pixel lines corresponding to the alternative nozzles whose nozzle position numbers are 6 and 8 has increased compared to that before the non-ejection complementation processing. Then, the density of each pixel on the pixel line corresponding to the non-ejectable nozzle whose nozzle position number is 7 has decreased compared to that before the non-ejection complementation processing. Due to this, the trouble on an image, such as streak and unevenness, which results from the non-ejectable nozzle is suppressed. Then, also on the pixel line corresponding to the non-ejectable nozzle, to the pixel whose tone value is larger than or equal to a predetermined value (here, 170 or larger), a value between "18" and "255" is attached in accordance with its original pixel value. Due to this, the non-ejectable nozzle is driven in the high-density area in which the influence of the non-ejectable nozzle is unlikely to appear, and therefore, the chance for the non-ejectable nozzle to recover naturally is secured.

At S506, the halftone processing unit 304 generates halftone image data by performing halftone processing for the input image data for which the non-ejection complementation processing described above has been performed.

The above is the contents of the processing in the image processing unit 106 according to the present embodiment.

<Modification Example>

In the present embodiment, the non-ejection complementation processing unit 303 corrects the pixel values of pixels on the pixel lines of the non-ejectable nozzle and the alternative nozzles based on the correction information (LUT) for the non-ejectable nozzle and the alternative nozzles. However, it may also be possible to distribute the pixel values of the pixels on the pixel line of the non-ejectable nozzle directly to the pixel values of the pixels on the pixel lines of the alternative nozzles thereof. In this case, the amount that cannot be distributed to the alternative nozzles (corresponding to the amount by which the maximum value 255 is exceeded) is found by calculation and the pixel value corresponding to the excess amount is taken as the pixel value of the pixel on the pixel line of the non-ejectable nozzle. By the method of directly distributing the pixel value corresponding to the excess amount, it is also possible to obtain the same results as those of the non-ejection complementation processing described above.

Further, in the present embodiment, the alternative nozzles are the two nozzles located on both sides of the non-ejectable nozzle, but the present embodiment is not limited to this. It may also be possible to take more neighboring nozzles located in close proximity to the non-eject-able nozzle in the direction parallel to the nozzle column as the alternative nozzles. In this case, it is sufficient to design an LUT by which the pixel values are corrected so that the alternative nozzle more distant from the non-ejectable nozzle assumes a density closer to the density that is assumed by the normal nozzle.

Second Embodiment

In the first embodiment, the aspect is explained in which as the non-ejection complementation processing, the pixel values in the input image data are corrected. Next, an aspect is explained as a second embodiment in which it is premised that dither processing is performed as halftone processing and as non-ejection complementation processing, a threshold value matrix for dither processing is corrected based on non-ejectable nozzle information. The same symbol is attached to the same configuration as that of the first embodiment and detailed explanation is omitted.

(Function Configuration of Image Processing Unit 106)

Figure 7:
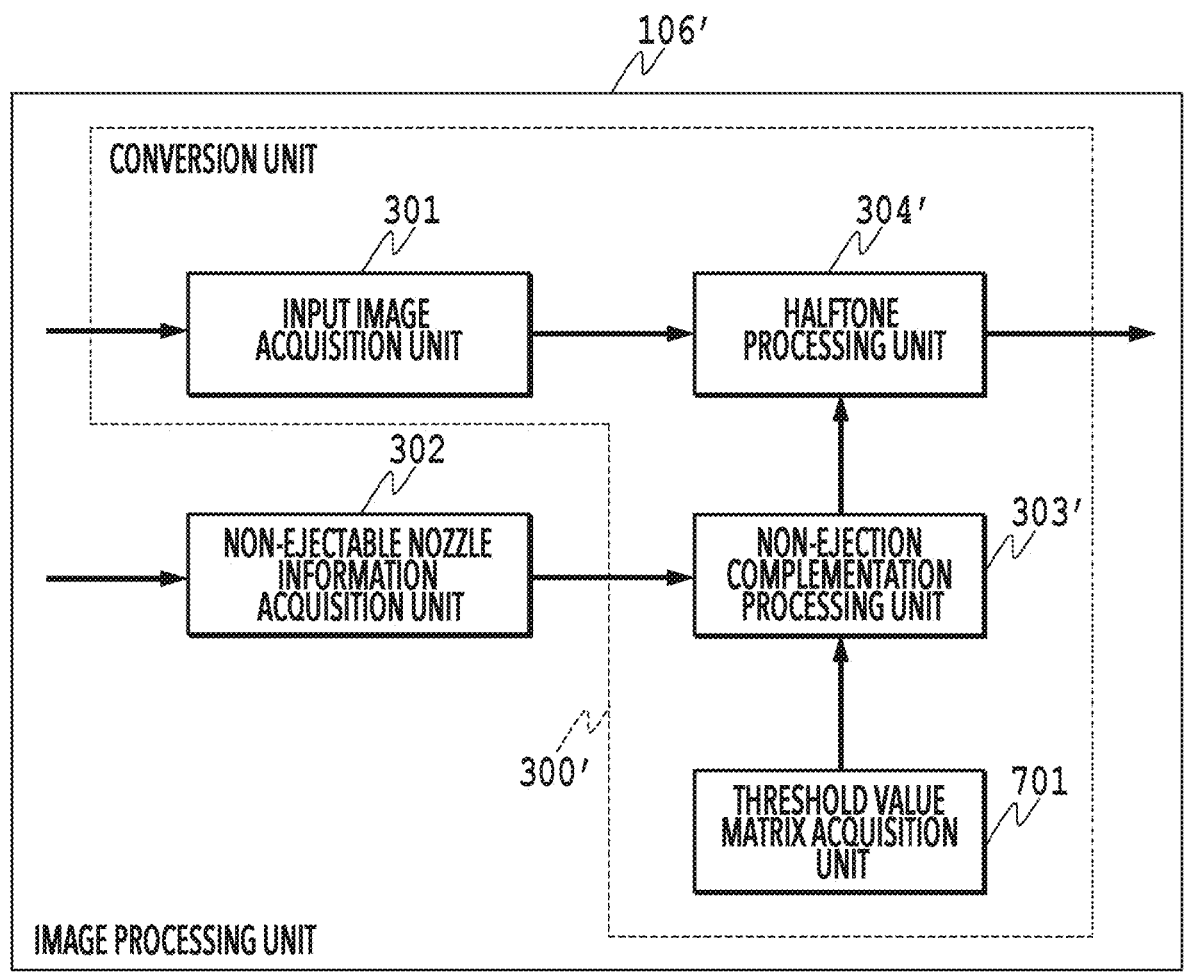
FIG. 7 is a block diagram showing a function configuration of an image processing unit according to a second embodiment.

FIG. 7 is a block diagram showing a detailed configuration of an image processing unit 106' according to the present embodiment. The image processing unit 106' has a conversion unit 300' and the non-ejectable nozzle information acquisition unit 302. The conversion unit 300' in the present embodiment further comprises the input image acquisition unit 301, a threshold value matrix acquisition unit 701, a non-ejection complementation processing unit 303', and a halftone processing unit 304'.

The threshold value matrix acquisition unit 701 acquires a threshold value matrix for dither processing, which is prepared in advance, from the RAM 101 or the external storage device 105. Here, it is assumed that the dither processing means processing to determine on or off of a dot by comparing the pixel value of each pixel in input image data and the threshold value corresponding thereto in order to reproduce a halftone. Then, in the present embodiment, in a case where the pixel value is larger than or equal to the threshold value, the output pixel value is set to "1" to indicate on of the dot and in a case where the pixel value is less than the threshold value, the output pixel value is set to "0" to indicate off of the dot.

The non-ejection complementation processing unit 303' performs the non-ejection complementation processing to secure the chance for the non-ejectable nozzle to recover naturally as a normal nozzle while suppressing the deterioration of the image quality due to the non-ejectable nozzle by using correction information on the non-ejectable nozzle and the alternative nozzle, like the non-ejection complementation processing unit 303 of the first embodiment. The present embodiment differs from the first embodiment in the correction target and that the threshold values within the threshold value matrix are corrected, not the pixel values within the input image data. The correction information in the present embodiment is also created in advance in the lookup table (LUT) format, which indicates the relationship between the input threshold value and the output threshold value, or in the function format and stored in the RAM 101 or the external storage device 105. Details of the correction information will be described later.

The halftone processing unit 304' generates halftone image data by performing dither processing by using the threshold value matrix for which the correction has been performed by the non ejection complementation processing unit 303' for the multi-valued input image data acquired by the input image acquisition unit 301.

(Details of Correction Information)

Following the above, correction information used in the non-ejection complementation processing unit 303' is explained in detail. FIG. 8A to FIG. 8F each show an example of correction information in the LUT format, in each LUT in FIG. 8A to FIG. 8F, the relationship between the input threshold value and the output threshold value, which corresponds to the non-ejectable nozzle, is indicated by each of thin solid lines T802a to T802f and the relationship between the input threshold value and the output threshold value, which corresponds to the alternative nozzle, is indicated by each of dotted lines T801a to T801f. In addition, for comparison, the relationship between the input threshold value and the output threshold value, which corresponds to the normal nozzle that is not the correction target, is indicated by each of thick solid lines T800a to T800f.

In a case of the basic LUT shown in FIG. 8A, from the comparison between the dotted line T801a and the thick solid line T800a, for the alternative nozzle, the correction characteristic is that a threshold value 1/1.5 times that of the normal nozzle is obtained. That is, in a halftone image obtained by the comparison between the threshold value after being corrected using the LUT in FIG. 8A and the input tone value, an ink ejection volume 1.5 times that of the normal nozzle is obtained for the alternative nozzle. Due to this, by the two alternative nozzles located on both sides of the non-ejectable nozzle, the dots (densities corresponding to the dots) to be formed by the non-ejectable nozzle are complemented. Further, from the comparison between the thin solid line T802a and the thick solid line T800a, for the non-ejectable nozzle, the correction characteristic is that a threshold value 1.5 times that of the normal nozzle is obtained. In this case, in a halftone image obtained by the comparison between the threshold value after being corrected and the input tone value, the drive of the non-ejectable nozzle is not performed until the input tone value becomes a tone value (here, "170") 1/1.5 times that of the maximum value (here, "255"). Then, after the density of the pixel corresponding to the alternative nozzle becomes the maximum density, the drive of the non-ejectable nozzle is started.

As above, in a case where the threshold values are corrected by using the LUT shown in FIG. 8A, the threshold values within the threshold value matrix are corrected so that the number of times of drive of the nozzle increases compared to that at the normal time for the alternative nozzle and the number of times of drive of the nozzle decreases compared to that at the normal time for the non-ejectable nozzle. Then, the threshold values on the pixel line of the non-ejectable nozzle are corrected so that the non-ejectable nozzle is driven at least in part of the density area. In a case where a halftone image is generated by performing dither processing using the threshold value matrix after being corrected based on the LUT in FIG. 8A, as in the first embodiment, the chance for the non-ejectable nozzle to recover naturally as a normal nozzle is secured while reducing streak and unevenness due to the non-ejectable nozzle. Each LUT in FIG. 8B to FIG. 8F corresponds to each LUT shown in FIG. 4B to FIG. 4F of the first embodiment, respectively. That is, by performing the correction of the threshold values within the threshold value matrix by using each LUT specifying the relationship between the input threshold value and the output threshold value shown in FIG. 8B to FIG. 8F, the same effect as that in a case where the correction of the pixel values within the input image data is performed by using each LUT in FIG. 4B to FIG. 4F is obtained.

(Details of Image Processing Unit)

Next, processing in the image processing unit 106" in the present embodiment is explained in detail with reference to the flowchart shown in FIG. 9.

First, at S901, the input image acquisition unit 301 acquires input image data, the non-ejectable nozzle information acquisition unit 302 acquires non-ejectable nozzle information, and the threshold value matrix acquisition unit 701 acquires a threshold value matrix. FIG. 10A shows an example of a threshold value matrix whose size is the same as that of the input image data of 16 pixels×16 pixels shown in FIG. 6A described previously. Each numerical value within the threshold value matrix indicates the threshold value that is compared with each pixel value in the input image data. In a case where the width of the threshold value matrix is less than the nozzle width, the entire nozzle width is covered by sequentially developing the threshold value matrix in a tiling manner. Here, the following explanation is given on the assumption that information specifying the No. 7 nozzle as the non-ejectable nozzle is acquired by the non-ejectable nozzle information acquisition unit 302.

Next, at S902, the non-ejection complementation processing unit 303' specifies matrix lines (corresponding to "pixel line" in input image data) corresponding to the non-ejectable nozzle of interest and the alternative nozzles thereof, respectively, within the threshold value matrix based on the non-ejectable nozzle information acquired at S901. Here, the non-ejectable nozzle is only the nozzle whose nozzle position number is 7, and therefore, the No. 7 nozzle is the non-ejectable nozzle of interest. Then, the matrix line whose nozzle position number is 7 in the threshold value matrix shown in FIG. 10A is specified as the matrix line corresponding to the non-ejectable nozzle. Further, the two matrix lines adjacent to the No. 7 matrix line, that is, the matrix lines whose nozzle position numbers are 6 and 8 are specified as the matrix lines corresponding to the alternative nozzles.

Next, at S903, the non-ejection complementation processing unit 303' corrects the threshold values on the matrix line corresponding to the non-ejectable nozzle of interest specified at S902 based on the correction information. For example, in a case where the LUT shown in FIG. 8A described above is used as the correction information, the threshold values are corrected based on the thin solid line T802a corresponding to the non-ejectable nozzle.

Next, at S904, the non-ejection complementation processing unit 303' corrects the threshold values on the matrix lines corresponding to the alternative nozzles specified at S902 based on the correction information. For example, in a case where the LUT shown in FIG. 8A described above is used as the correction information at S903, the threshold values are corrected based on the dotted line T801a corresponding to the alternative nozzles.

Next, at S905, whether or not the processing at S902 to S904 described above has been completed for all the non-ejectable nozzles indicated by the non-ejectable nozzle information acquired at S901 is determined. In a case where there is an unprocessed non-ejectable nozzle, the processing returns to S902, and the next non-ejectable nozzle of interest is determined and the threshold value correction processing is continued. On the other hand, in a case where the processing has been completed for all the non-ejectable nozzles, the processing advances to S906. At this time, the threshold value matrix for which the non-ejection complementation processing has been performed is sent to the halftone processing unit 304'. FIG. 10B shows a threshold value matrix after performing non-ejection complementation processing by using the LUT in FIG. 8A for the threshold value matrix shown in FIG. 10A described above. In the threshold value matrix in FIG. 10B, the threshold values on the matrix lines corresponding to the No. 6 and No. 8 alternative nozzles have become small compared to those before the non-ejection complementation processing. Then, the threshold values on the matrix line corresponding to the non-ejectable nozzle whose nozzle position number is 7 have become large compared to those before the non-ejection complementation processing. That is, it is known that the threshold value matrix has been corrected so that the density to be reproduced by the non-ejectable nozzle is reduced compared to that before the non-ejection complementation processing and the density corresponding to the reduced amount is complemented by the alternative nozzles.

<Modification Example>

Figure 9:
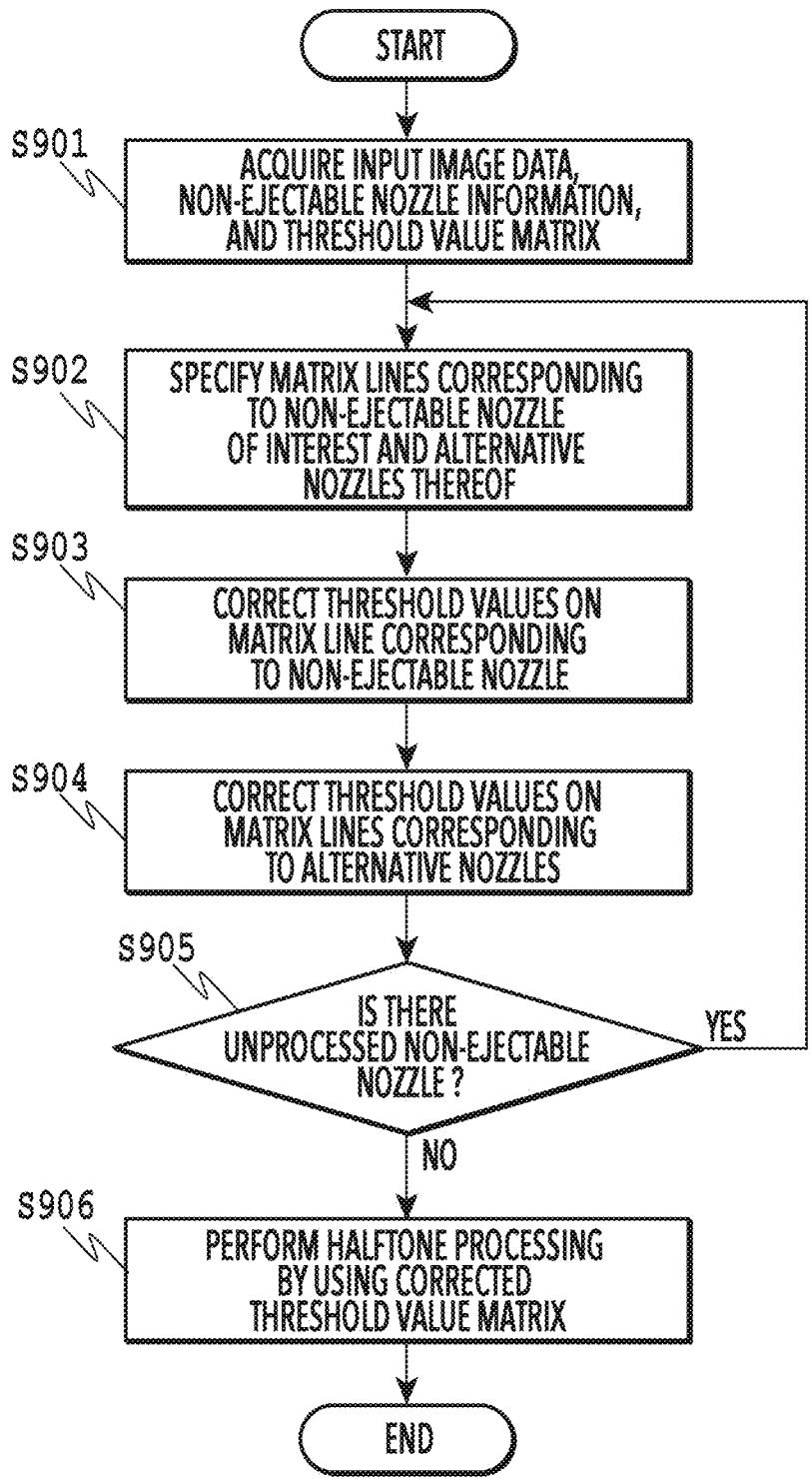
FIG. 9 is a flowchart showing a flow of processing in the image processing unit according to the second embodiment.

In the flow in FIG. 9 described above, the threshold value correction within the threshold value matrix as the non-ejection complementation processing is performed each time of the printing processing. In place of the above-described configuration, a configuration may be accepted in which a threshold value matrix having the nozzle width, which is obtained by applying in advance the non-ejection complementation processing, is stored in the RAM 101 or the external storage device 105 and dither processing is performed by reading the stored threshold value matrix at the time of printing processing. In this case, it is no longer necessary to perform the non-ejection complementation processing each time the printing processing is performed for the input image data.

Further, as in the first embodiment, the example is explained in which the two nozzles located on both sides of the non-ejectable nozzle are taken as the alternative nozzles, but it may also be possible to provide more alternative nozzles. In this case, it is sufficient to design an LUT by which the threshold values are corrected so that the alternative nozzle more distant from the non-ejectable nozzle assumes a density closer to the density that is assumed by the normal nozzle.

Third Embodiment

Next, an image forming system is explained as a third embodiment, in which it is possible to perform non-ejection complementation processing at appropriate timing while suppressing the frequency of execution of maintenance processing that requires a comparatively long time in a case where printing processing of a large number of sheets (for example, 1,000 sheets) is performed by using the same input image data. The same symbol is attached to the same configuration as that in the first embodiment and the second embodiment and detailed explanation is omitted.

Figure 11:
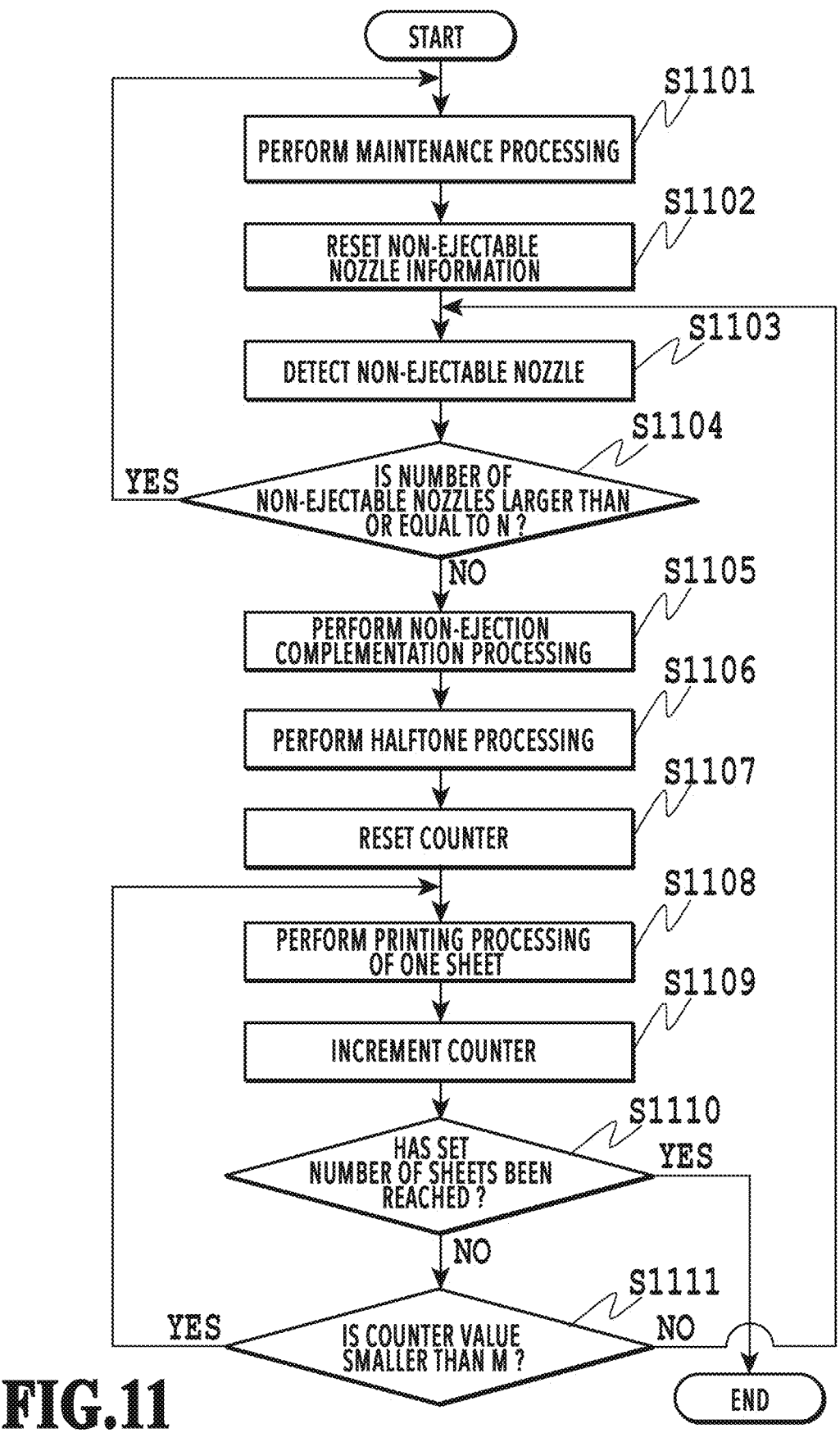
FIG. 11 is a flowchart showing a flow of control processing of an image forming system according to a third embodiment.

FIG. 11 is a flowchart showing a flow of control processing in the image forming system for performing non-ejection complementation processing at appropriate timing while suppressing the frequency of execution of maintenance processing according to the present embodiment. It is assumed that the series of processing shown in the flow in FIG. 11 is implemented by the CPU 100 executing a predetermined printing control program in response to the input of printing-target input image data to the image forming system.

First, at S1101, the maintenance unit 109 performs maintenance processing of a print head comprised by the image forming unit 107 in accordance with instructions of the CPU 100.

Figures 12A, 12B:
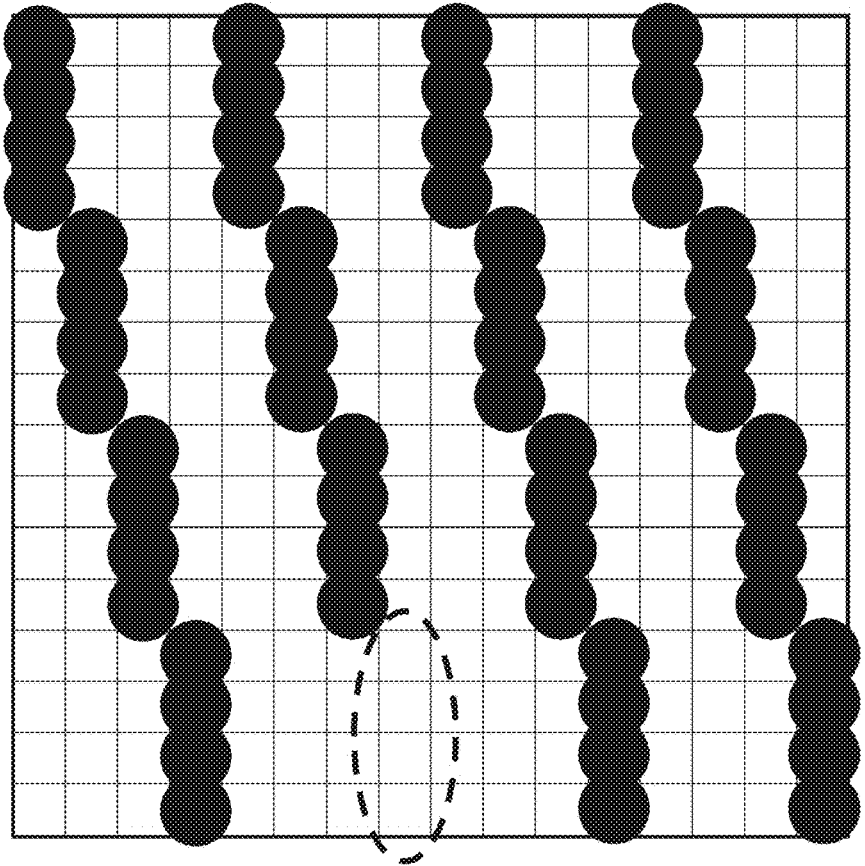
FIG. 12A is a diagram showing an example of a detection chart image and FIG. 12B is an image diagram of output results of a detection chart image in a case where a No. 7 nozzle is a non-ejectable nozzle.

Next, at S1102, the non-ejectable nozzle detection unit 108 resets the non-ejectable nozzle information stored in the RAM 101 or the external storage device 105. At S1103 that follows, the non-ejectable nozzle detection unit 108 performs non-ejectable nozzle detection processing. Specifically, first, the non-ejectable nozzle detection unit 108 gives the image forming unit 107 instructions to output a non-ejectable nozzle detection chart image (hereinafter, described as "detection chart image") in units of nozzle columns. Then, by acquiring and analyzing the output results of each nozzle column, the non-ejectable nozzle detection unit 108 specifies the position of the non-ejectable nozzle in each nozzle column. FIG. 12A is a diagram showing an example of the detection chart image and the numerical value of each pixel indicates a tone value. Figures "0" to "15" attached to the top of the detection chart image are nozzle position numbers corresponding to the respective pixel lines and it is assumed that the nozzle position numbers match with the nozzle position numbers in the print head shown in FIG. 2 described previously. As is obvious from FIG. 12A, in the detection chart image, a line-shaped mark is arranged in association with each nozzle so that it is possible to determine the presence/absence of ink ejection for each nozzle. FIG. 12B is an image diagram of the output results of the detection chart image in a case where the nozzle whose nozzle position number is 7 is the non-ejectable nozzle. As shown in FIG. 12B, in a portion enclosed with a broken line, which corresponds to the nozzle whose nozzle position number is 7, that is, the non-ejectable nozzle, the line-shaped mark that should originally be formed is not formed. By scanning the output results such as these and finding the correspondence between the position at which no line-shaped mark is formed ant the nozzle position number, it is made possible to detect the non-ejectable nozzle.

Next, at S1104, the CPU 100 determines whether or not the maintenance processing needs to be performed based on the detection results obtained at S1103, that is, based on the number of detected non-ejectable nozzles per nozzle column. Specifically, in a case where the number of detected non-ejectable nozzles is larger than or equal to a predetermined number N, the CPU 100 determines that the maintenance processing is necessary and in a case where the number of detected non-ejectable nozzles is less than the predetermined number N, the CPU 100 determines that the maintenance processing is not necessary. Here, the predetermined number N is determined by taking into consideration the total number of nozzles configuring each nozzle column, the required printing quality and the like. For example, in a case where each nozzle column is 10 inches long and each nozzle is compatible with a resolution of 1,200 dpi, in one nozzle column, 12,000 nozzles are arranged. In this case, on a condition that up to 0.5% of the total number of nozzles are permitted to be non-ejectable nozzles, the predetermined number N is determined to be 60 (N=60). In a case where the number of detected non-ejectable nozzles is less than the predetermined number N, the processing advances to S1105. On the other hand, in a case where the number of detected non-ejectable nozzles is larger than or equal to the predetermined number N, the processing returns to S1101 and the maintenance processing is performed. By the processing so far, control is performed so that the maintenance processing is performed only in a case where the non-ejectable nozzles corresponding to a predetermined number or more occur per nozzle column. In the present embodiment, whether the number of detected non-ejectable nozzles is larger than or equal to a predetermined number is taken as the determination condition and the non-ejection complementation processing is performed in a case where the number of detected non-ejectable nozzles is less than the predetermined number, but the present embodiment is not limited to this. For example, it may also be possible to perform determination by taking whether the number of successive non-ejectable nozzles is larger than or equal to a predetermined number as a reference, in this case, control is performed so that the maintenance processing is performed on a condition that a plurality of successive nozzles enters the non-ejection state.

Next, at S1105, the image processing unit 106 performs the non-ejection complementation processing described previously. The contents of the non-ejection complementation processing here may be the contents explained in the first embodiment, in which the pixel values within the input image data are corrected, or the contents explained in the second embodiment, in which the threshold values within the threshold value matrix used in the dither processing are corrected. At this step, to the nozzle that has newly become a non-ejectable nozzle, the non-ejection complementation processing is applied. On the other hand, the nozzle that has recovered from a non-ejectable nozzle is not detected as a non-ejectable nozzle at S1103 described above, and therefore, the nozzle is handled as a normal nozzle hereinafter.

Next, at S1106, the image processing unit 106 generates halftone image data that can be processed by the image forming unit 107 for the printing-target input image data. At this time, in a case where the contents of the first embodiment are applied as the non-ejection complementation processing, the halftone image data is generated by performing predetermined halftone processing for the input image data whose pixel values have been corrected. Further, in a case where the contents of the second embodiment are applied as the non-ejection complementation processing, the halftone image data is generated by performing the dither processing using the threshold value matrix whose threshold values have been corrected for the input image data.

Next, at S1107 the CPU 100 resets a counter that counts the number of times the printing processing is performed (number of printed sheets). At S1108 that follows, the image forming unit 107 forms an image corresponding to one sheet on a printing medium by driving the print head based on the halftone image data generated at S1106. Then, at S1109, the CPU 100 increments the count value of the counter (+1).

Next, at S1110, the CPU 100 determines whether or not the number of printed sheets has reached a set number of sheets (target number of printed sheets) for the input image data. For example, in a case where the set number of sheets is 1,000, whether or not the count value of the counter described above has reached "1,000" is determined. In a case where the count value has reached the set number of sheets, the printing processing for the input image data terminates and this processing is exited. On the other hand, in a case where the count value has not reached the set number of sheets, the processing advances to S1111 to continue the printing processing.

Next, at S1111, the CPU 100 determines whether or not the count value of the counter described above is less than a predetermined number M. The predetermined number M here is a numerical value for determining the frequency with which the occurrence of a new non-ejectable nozzle and whether the non-ejectable nozzle has recovered naturally are checked, and an arbitrary numerical value less than or equal to the set number of sheets described above, for example, a value, such as "100", is set. In a case where the count value is less than the predetermined number M, the processing returns to S1108 and the printing processing is continued. On the other hand, in a case where the count value is larger than or equal to the predetermined number M, the processing returns to S1103 and the non-ejectable nozzle detection processing is performed. Due to this, the non-ejectable nozzle detection processing is performed each time the printing processing of a predetermined number of or more sheets is performed, and therefore, the execution of the appropriate non-ejection complementation processing in accordance with the change in the state of the non-ejectable nozzle is guaranteed.

The above is the contents of the control processing of the image forming system for performing the non-ejection complementation processing at appropriate timing while suppressing the execution frequency of the maintenance processing. By performing the control as described above, the maintenance processing is performed only in a case where the number of non-ejectable nozzles within the nozzle column becomes larger than or equal to the predetermined number N. Further, as described previously, in the non-ejection complementation processing explained in the first embodiment or the second embodiment, the chance for the non-ejectable nozzle to recover naturally as a normal nozzle is secured. Because of this, it is possible to expect the natural recovery of the non-ejectable nozzle during the printing processing and suppress the occurrence of the state where the number of non-ejectable nozzles becomes larger than or equal to the predetermined number N. As a result of that, compared to the case of the conventional non-ejection complementation processing, the frequency of the maintenance processing is also suppressed.

Fourth Embodiment

In each previous embodiment, the aspect is explained in which the non-ejection complementation processing is performed which is capable of securing the chance for the non-ejectable nozzle to recover naturally as a normal nozzle while suppressing trouble on an image, such as streak and unevenness, due to the non-ejectable nozzle based on the correction information prepared in advance. Next, an aspect is explained as a fourth embodiment in which correction information with a higher accuracy is generated by determining appropriate correction amounts for the non-ejectable nozzle and the alternative nozzle based on reading results obtained by performing test printing.

(Explanation of Test Printing Chart Image)

Figures 13A, 13B:
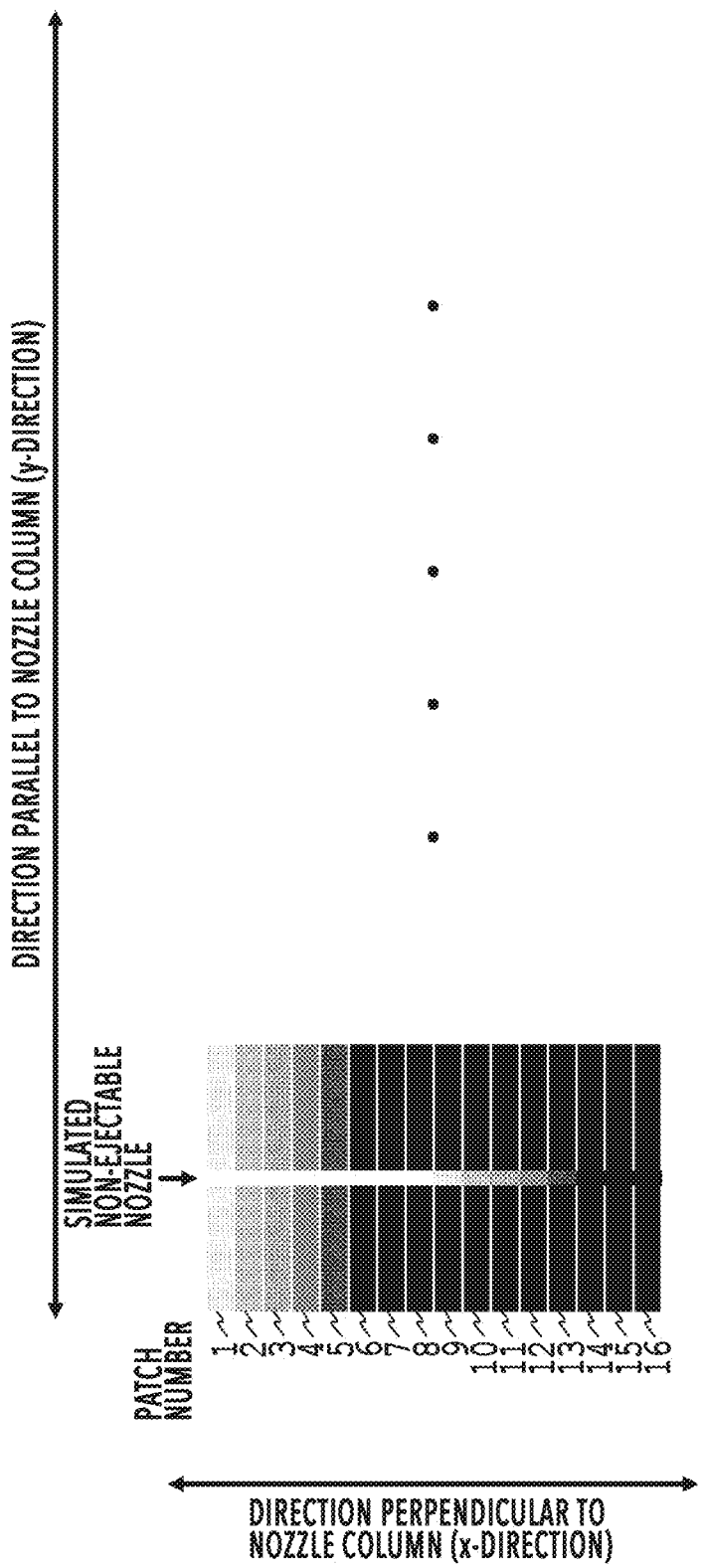
FIG. 13A is a diagram showing an example of a test printing chart image and FIG. 13B is a table showing pixel values in each area within a patch.

FIG. 13A is a diagram showing an example of a test printing chart image (hereinafter, described as "test chart image") used in the present embodiment. The test chart image in FIG. 13A has a configuration in which 16 horizontally elongated patches whose tones are different from one another are arranged one on top of another in the direction perpendicular to the nozzle column. Then, in each patch, an area (pixel line to which a different pixel value is given) having a density different from that of the other pixel lines exists. This area having a different density corresponds to the non-ejectable nozzle. That is, different pixel values are given to the area (pixel line) corresponding to the non-ejectable nozzle and to the area corresponding to the other nozzles (alternative nozzle, normal nozzle). The table in FIG. 13B shows the pixel values of each of the above-described areas in association with a patch number i (=1 to 16). As is obvious from the table in FIG. 13B, to the area corresponding to the non-ejectable nozzle, a significant pixel value (value larger than 0) is given only in a case where the pixel value of the area corresponding to the other nozzles is the maximum value (here, "255"). Due to this, it is possible to acquire the density characteristic that a dot is formed preferentially by the alternative nozzle and at the point in time at which the maximum tone value that cannot be complemented by the alternative nozzle is reached, an attempt is made to cause the non-ejectable nozzle to form a dot. Here, the "area corresponding to the non-ejectable nozzle" within each patch is provided at the nozzle position (pixel line) of a non-ejectable nozzle that is set in a simulated manner to generate correction information. In the following, the non-ejectable nozzle that is set in a simulated manner is called a "simulated non-ejectable nozzle" to distinguish it from the non-ejectable nozzle in which an ejection failure has occurred actually. In FIG. 13A, for convenience of explanation, only one simulated non-ejectable nozzle is shown, but in the actual test chart image, areas corresponding to a plurality of simulated non-ejectable nozzles are provided. For example, in a case of a nozzle column 10 inches long, it is sufficient to set five to ten simulated non-ejectable nozzles. Further, in a case where the print head comprises four nozzle columns corresponding to the four colors of CMYK, the test chart image is prepared for each nozzle column.

(Reading Results of Test Chart Image)

Figure 14:
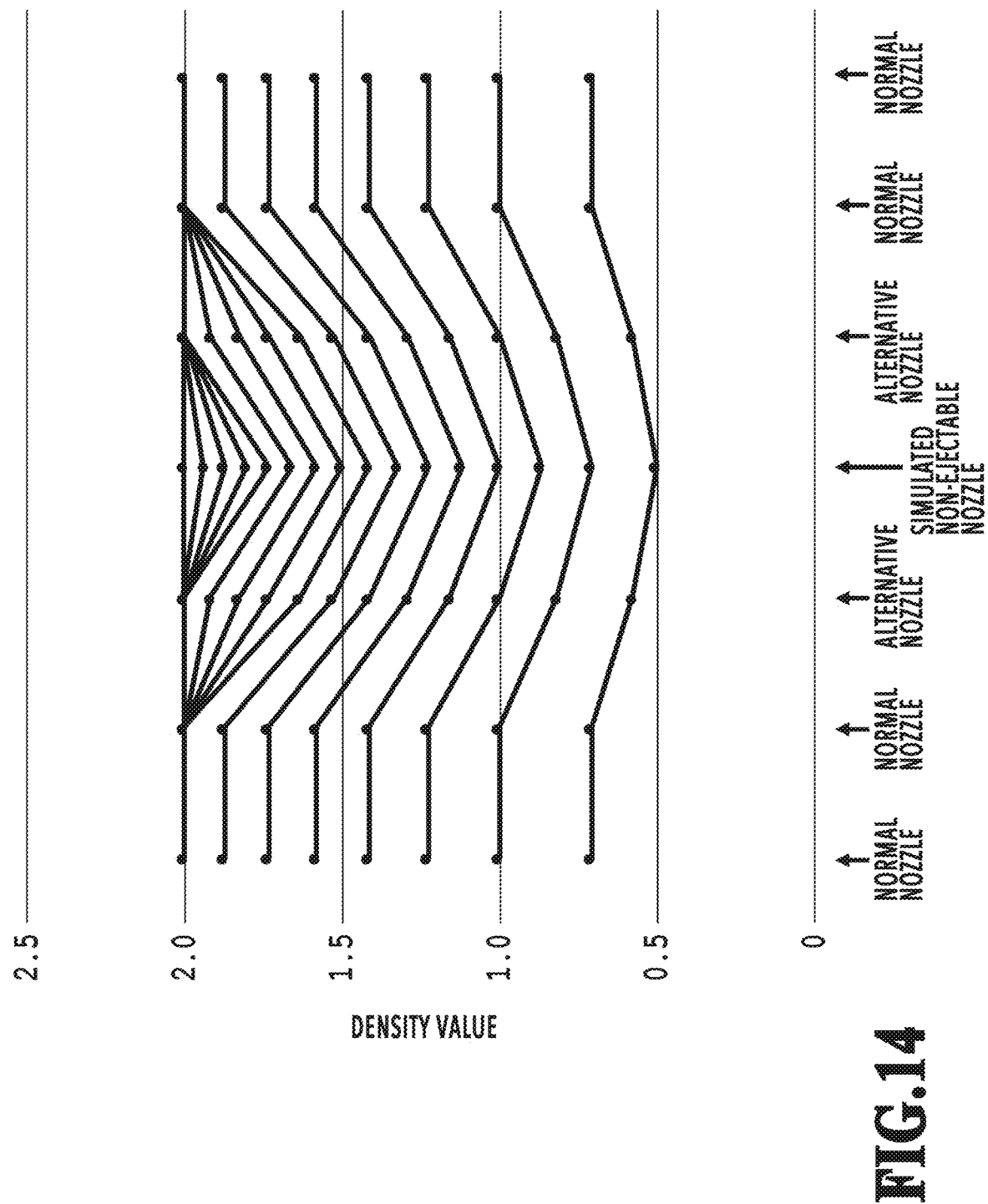
FIG. 14 is a graph indicating density values of each patch.

In the present embodiment, the non-ejectable nozzle detection unit 108 captures the printing results of the test chart image that is output from the image forming unit 107, analyzes the captured image, and acquires the printing density (density value) of each patch. The graph in FIG. 14 is a graph in which the horizontal axis represents the nozzle position with the simulated non-ejectable nozzle being, taken as a center and the vertical axis represents the density value of each patch acquired by the non-ejectable nozzle detection unit 108. The density value at each nozzle position of each patch is found by averaging the signal value obtained from the image area of each patch in the captured image for each nozzle position. In the present embodiment, a value obtained by converting the signal value acquired by an image sensor into a signal value corresponding to the optical density is used. For example, in a case where it is assumed that the image sensor can acquire a signal value S corresponding to luminance linear in eight bits, it is possible to obtain a signal value D corresponding to the density value by finding $D=-LOG((S+1)/256)$. The reason the maximum value of the density value is "2.0" in the graph in FIG. 14 is that acquisition is performed by adjusting the image capturing conditions so that the signal value S acquired by the image sensor falls within the tone range (0 to 255) and that even in a case of the patch including the maximum pixel value "255" (patch number i=16), the signal value S indicating luminance is detected though slightly (signal value S does not become 0). Similarly, the reason the minimum value of the density value is "0.5" is that the signal value S indicating the maximum luminance, which is detected in the patch including the minimum pixel value "0" (patch number i=1), is set to about "230". In a case where the resolution in the nozzle column direction of the image sensor comprised by the non-ejectable nozzle detection unit 108 is different from the resolution of each nozzle column comprised by the print head within the image forming unit 107, it is sufficient to find the density value corresponding to the resolution of the nozzle column by performing the already-known resolution conversion processing.

Figure 15:
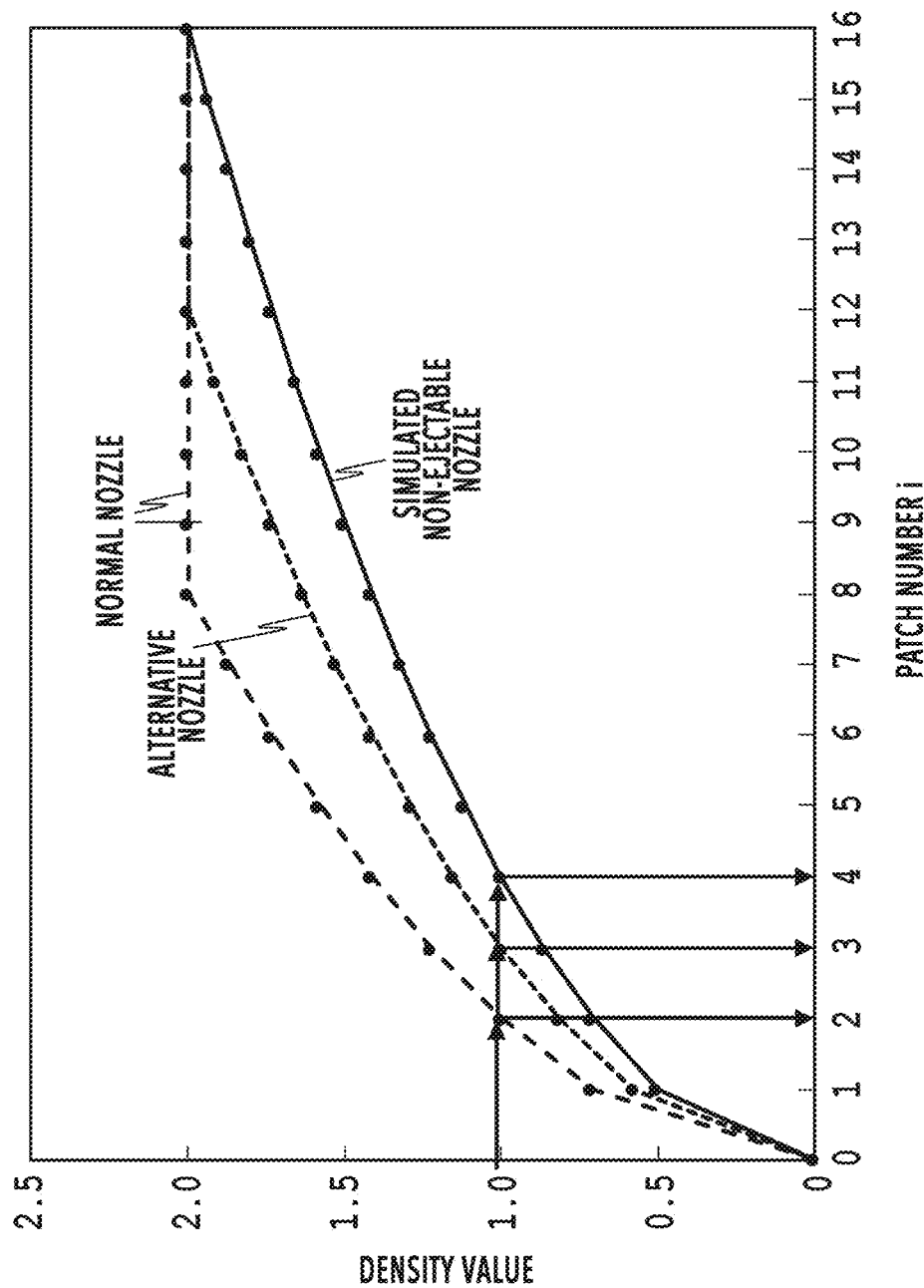
FIG. 15 is an example of representative data representing a relative relationship corresponding to a normal nozzle, an alternative nozzle, and a non-ejectable nozzle.

Further, the non-ejectable nozzle detection unit 108 generates data (in the following, called "representative date") representing the relative relationship between the normal nozzle, the alternative nozzle, and the simulated non-ejectable nozzle based on the density value of each patch acquired as described above. Specifically, for each of the above-described three kinds of nozzle, similar patch groups are formed so as to correspond to the number of the plurality of nozzles, and therefore, the sum of the density values corresponding to the number of the plurality of nozzles in each of the normal nozzle, the alternative nozzle, and the simulated non-ejectable nozzle is found and each average is calculated. In this manner, the density value as the representative value of each of the normal nozzle, the alternative nozzle, and the simulated non-ejectable nozzle is obtained. FIG. 15 shows an example of a graph as the representative data representing the relative relationship between the normal nozzle, the alternative nozzle, and the simulated non-ejectable nozzle, which is generated based on the graph in FIG. 14. In the graph in FIG. 15, the horizontal axis represents the patch number i and the vertical axis represents the density value as the representative value of each nozzle type. Here, the patch number i=0 indicates the density value of the paper white portion of a printing medium. It may also be possible to input a value obtained by actually measuring the paper white portion or set the density value to "0" at all times on the assumption that the paper white portion is uniformly constant. The density value that is acquired here may not be the optical density. The density value may be the signal value itself acquired by the image sensor or a value obtained after the signal value is converted into a value representing luminance or lightness. The density value is only required to be capable of acquiring the representative data representing the relative relationship between the normal nozzle, the alternative nozzle, and the simulated non-ejectable nozzle.

(Generation of Correction Information Used in the First Embodiment)

Following the above, a procedure is explained in a case where correction information (LUT used at the time of correcting pixel values in input image data) used in the first embodiment is generated based on the representative data shown in FIG. 15. In a case where the correction information used in the first embodiment is generated, based on the graph shown in FIG. 15, the pixel values on each pixel line in the alternative nozzle and the non-ejectable nozzle for implementing the same density as that of the normal nozzle are found. In the following, detailed explanation is given.

For example, the pixel values of the patches necessary at the time of implementing the density values "1" and "1.4" are as follows from the graph in FIG. 15 and the table in FIG. 13B.

<Case of Density Value "1"> normal nozzle: pixel value "64" corresponding to patch number i=2 alternative nozzle: pixel value "96" corresponding to patch number i=3 simulated non-ejectable nozzle: pixel value "0" corresponding to patch number i=4

<Case of Density Value "1.4"> normal nozzle: pixel value "128" corresponding to patch number i=4 alternative nozzle: pixel value "192" corresponding to patch number i=6 simulated non-ejectable nozzle: pixel value "0" corresponding to patch number i=8

It may be possible to find the pixel value on each pixel line that implements a density portion at which no patch exists by interpolation calculation using the pixel value on each pixel line obtained from the patch adjacent to the density portion. At the time of finding intermediate data by the interpolation calculation from the discrete data such as this, it may be possible to appropriately apply a publicly known method, but this is not the main purpose of the present disclosure, and therefore, explanation is omitted.

Figure 16:
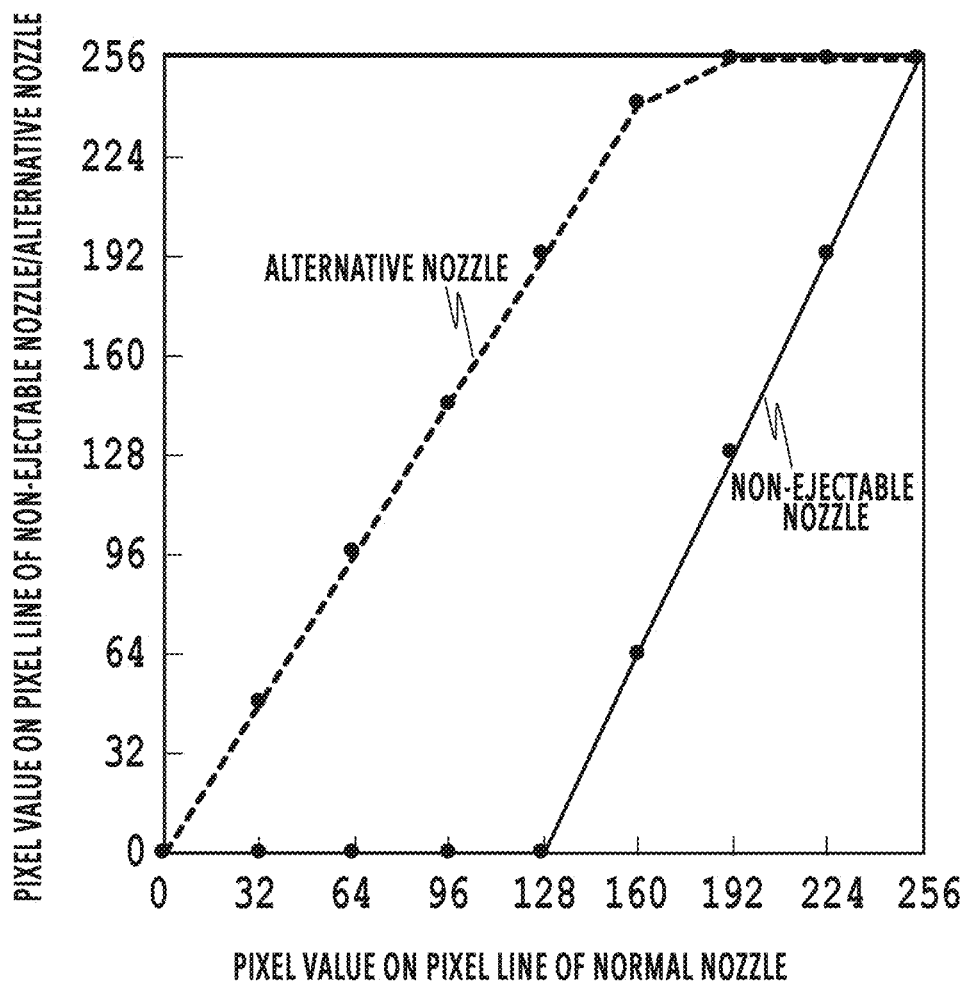
FIG. 16 is an example of correction information in an LUT format according to a fourth embodiment.

Then, by using the results of performing the work as described above for the density value at each level, the LUT as correction information as shown in FIG. 16 is generated. In the LUT shown in FIG. 16, the relationship between the pixel values of the normal nozzle, the alternative nozzle, and the non-ejectable nozzle at the time of implementing a variety of densities from the low-density area to the high-density area is shown. In the LUT shown in FIG. 16, the horizontal axis represents the pixel value on the pixel line of the normal nozzle and the vertical axis represents the pixel value on the pixel line of the non-ejectable nozzle/alternative nozzle. The LUT thus obtained is stored as correction information in the RAM 101 or the external storage device 105.

(Generation of Correction Information Used in the Second Embodiment)

Figure 17:
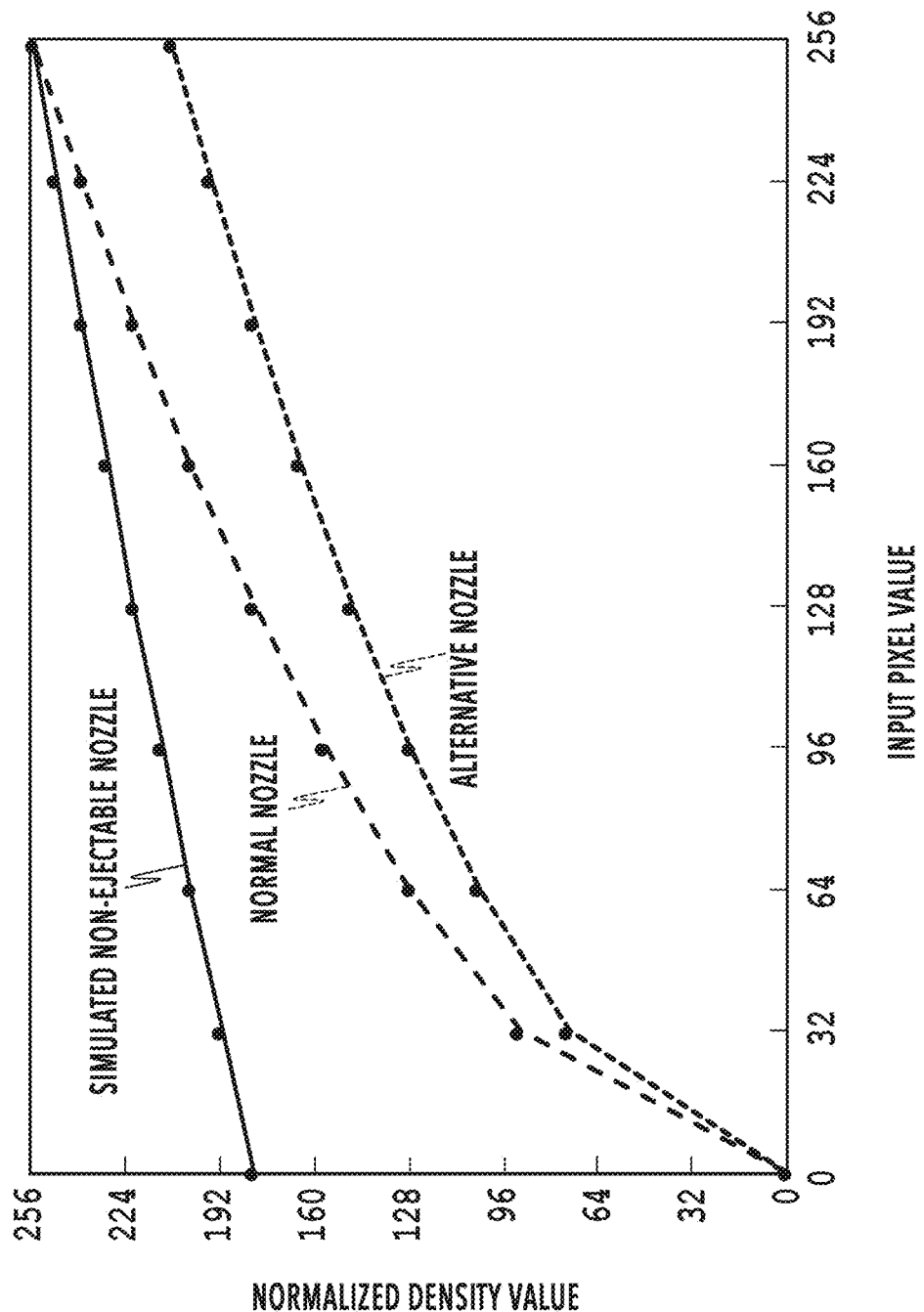
FIG. 17 is a graph indicating a relationship of normalized density values for input pixel values.

Following the above, a procedure is explained in a case where correction information (LUT used at the time of correcting threshold values in threshold value matrix) used in the second embodiment is generated based on the representative data shown in FIG. 15. In a case where correction information used in the second embodiment is generated, in place of the graph in FIG. 15, a graph in which the horizontal axis and the vertical axis are set anew as shown in FIG. 17 is used. Specifically, a graph is used in which the horizontal axis represents the input pixel value (here, "0 to 255") on the pixel line corresponding to the patch number i and the vertical axis represents the normalized density value obtained by performing normalization so that the maximum density value (here, "2") is the maximum threshold value (here, "255"), From the relationship between the patch number i and the pixel value shown in the table in FIG. 13B, for the normal nozzle and the alternative nozzle, the graph corresponds to the portion of the patch number i=0 to 8 in FIG. 15 and for the non-ejectable nozzle, the graph corresponds to the portion of the patch number i=8 to 16.

Figure 18:
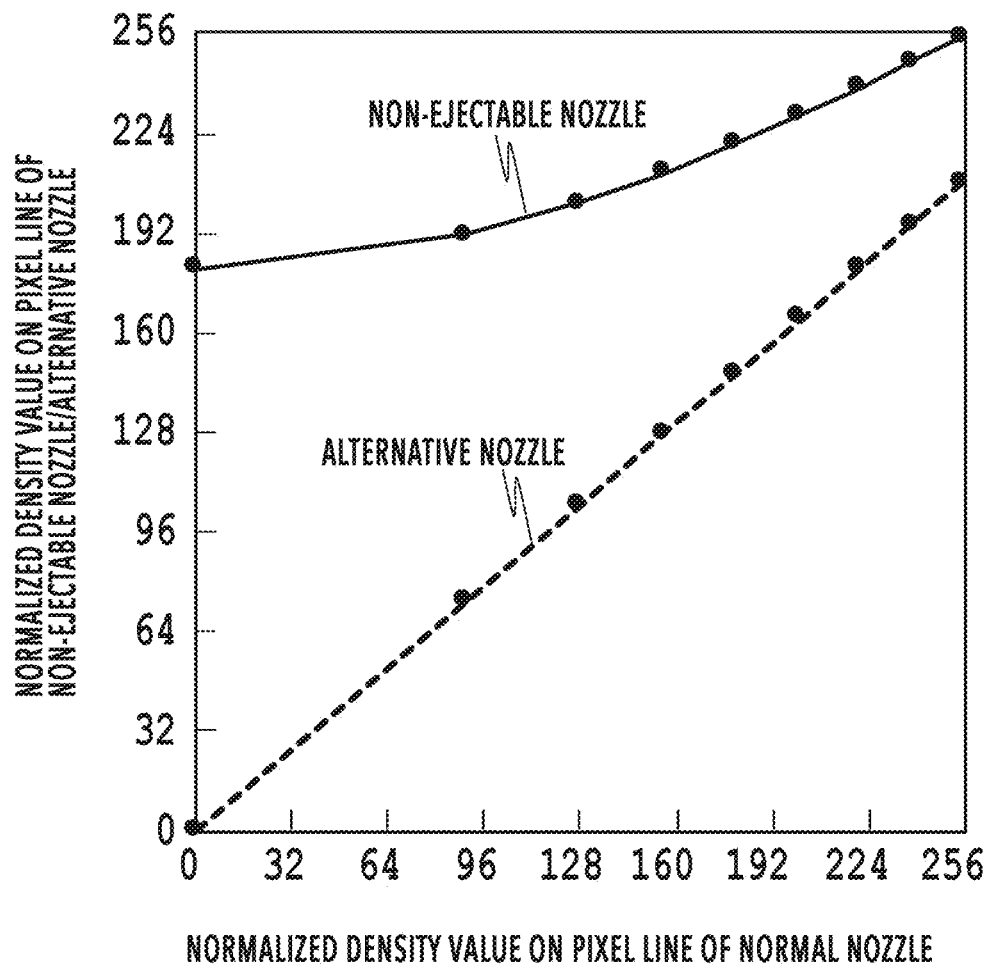
FIG. 18 is an example of correction information in an LUT format according to the fourth embodiment.

Then, an LUT as correction information as shown in FIG. 18 is generated in which the horizontal axis represents the normalized density value on the pixel line of the normal nozzle and the vertical axis represents the normalized density value on the pixel line of the non-ejectable nozzle/alternative nozzle. The LUT in FIG. 18 shows the density values of the non-ejectable nozzle and the alternative nozzle for the density value of the normal nozzle in a case where the test chart image in FIG. 13A is printed and output. Based on this LUT, the threshold values within the threshold value matrix are corrected. Specifically, in a case where the normalized density value is lower than that of the normal nozzle (that is, in a case of the alternative nozzle), in accordance with the degree of deviation (difference), the correction to make the threshold value smaller is performed so that the output density by the alternative nozzle becomes high. On the other hand, in a case where the normalized density value is higher than that of the normal nozzle (that is, in a case of the non-ejectable nozzle), in accordance with the degree of deviation, the correction to make the threshold value larger is performed so that the output density by the non-ejectable nozzle becomes low. The LUT thus obtained is stored as correction information in the RAM 101 or the external storage apparatus 105.

As above, by generating correction information based on the actual value using the test chart, non-ejection complementation processing with a higher accuracy is enabled, and therefore, it is possible to more appropriately suppress trouble on an image, such as streak and unevenness, due to the non-ejectable nozzle.

<Other Embodiments>

In the first to fourth embodiments, explanation is given by taking the case as an example where the image forming unit 107 mounts the head comprising one nozzle drawing the same pixel line. However, it is also possible to similarly apply the contents described in each embodiment to an image forming unit mounting a multi-column head comprising a plurality of nozzles drawing the same pixel line. That is, in addition to the embodiment in which the adjacent nozzle is taken as the alternative nozzle on the nozzle column, it is also possible to apply the contents similarly to a case where the non-ejection complementation processing is performed by taking the nozzle at the position corresponding to another nozzle column drawing the same pixel line as that of the non-ejectable nozzle as the alternative nozzle.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to suppress deterioration of image quality due to an ink ejection failure while securing the chance for a nozzle in which an ejection failure has occurred to recover as a normal nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-214297, filed Nov. 27, 2019, which is hereby incorporated by reference wherein in its entirety.

What is claimed is:

1. An image processing apparatus that generates halftone image data used by an image forming apparatus that forms an image on a printing medium by a print head including a nozzle column in which a plurality of nozzles is arrayed ejecting ink from the nozzles while relatively moving the printing medium in a direction perpendicular to the nozzle column, the image processing apparatus comprising:
    an acquisition unit configured to acquire positional information for specifying an abnormal nozzle in which an ejection failure has occurred among the plurality of nozzles; and
    a conversion unit configured to convert, based on the positional information, multi-valued input image data into the halftone image data so that (i) at least part of densities that are assumed to be obtained by a pixel line of the abnormal nozzle are distributed to pixels on a pixel line of a neighboring nozzle that is located in close proximity to the abnormal nozzle and in which no ejection failure has occurred and (ii) in the halftone image data, at least in part of tones, a pixel on the pixel line of the abnormal nozzle has a density.

2. The image processing apparatus according to claim 1, wherein
    the conversion unit converts the input image data into the halftone image data so that the pixel on the pixel line of the abnormal nozzle in the halftone image data has a density in a case where the pixel on the pixel line of the abnormal nozzle in the input image data is of high density, and so that the pixel on the pixel line of the abnormal nozzle in the halftone image data has no density in a case where the pixel on the pixel line of the abnormal nozzle in the input image data is of low density.

3. The image processing apparatus according to claim 2, wherein
    the conversion unit:
        takes a plurality of nozzles including a nozzle adjacent to the abnormal nozzle and a nozzle not adjacent to the abnormal nozzle as the neighboring nozzles; and
        distributes densities to the pixel line of the neighboring nozzle among the pixel lines of the plurality of neighboring nozzles, which is more distant from the pixel line of the abnormal nozzle, so that the pixel line assumes a density closer to a density that is assumed to be obtained by another nozzle that is a nozzle different from the neighboring nozzle and in which no ejection failure has occurred.

4. The image processing apparatus according to claim 1, wherein
    the conversion unit:
        performs conversion by correcting, based on the positional information, threshold values on a matrix line corresponding to the abnormal nozzle and threshold values on a matrix line corresponding to the neighboring nozzle among threshold values of a threshold value matrix used in dither processing; and
        converts the input image data into the halftone image data by performing the dither processing by using the corrected threshold value matrix for the input image data.

5. The image processing apparatus according to claim 4, wherein
    the conversion unit performs conversion by correcting the threshold values on the matrix line corresponding to the abnormal nozzle to larger threshold values and correcting the threshold values on the matrix line corresponding to the neighboring nozzle to smaller threshold values.

6. The image processing apparatus according to claim 1, wherein
    the conversion unit:
        performs conversion by correcting, based on the positional information, pixel values of the pixels on the pixel line of the abnormal nozzle and pixel values of the pixels on the pixel line of the neighboring nozzle of the input image data; and
        converts the input image data into the halftone image data by performing halftone processing for the corrected input image data.

7. The image processing apparatus according to claim 6, wherein
    the conversion unit performs conversion by performing correction to proportionally divide the pixel values of the pixels on the pixel line of the abnormal nozzle and add the proportionally divided pixel values to the pixel values of the pixels on the pixel line of the neighboring nozzle.

8. The image processing apparatus according to claim 7, wherein
    the conversion unit performs conversion by correcting, in a case where the pixel value of the pixel on the pixel line of the neighboring nozzle after the addition is performed is larger than or equal to a predetermined value, the pixel value of the pixel on the pixel line of the abnormal nozzle to a value larger than 0.

9. The image processing apparatus according to claim 6, further comprising:
    a storage unit configured to store first correction information associating input pixel values and output pixel values with each other, which is for correcting the pixel values of the pixels on the pixel line of the abnormal nozzle, and second correction information associating input pixel values and output pixel values with each other, which is for correcting the pixel values of the pixels on the pixel line of the neighboring nozzle, wherein
    the conversion unit:
        performs conversion by correcting the pixel values of the pixels on the pixel line of the abnormal nozzle within the input image data by using the first correction information; and
        performs conversion by correcting the pixel values of the pixels on the pixel line of the neighboring nozzle within the input image data by using the second correction information.

10. The image processing apparatus according to claim 9, wherein
    the first correction information is information having a characteristic that the input pixel values are corrected so that, in an intermediate tone, a number of times of drive of the abnormal nozzle is smaller than a number of times of drive of another nozzle that is a nozzle different from the neighboring nozzle and in which no ejection failure has occurred and, in a dark tone, the number of times of drive of the abnormal nozzle is substantially equal to the number of times of drive of the other nozzle and
    the second correction information is information having a characteristic that the input pixel values are corrected so that, in an intermediate tone, a number of times of drive of the neighboring nozzle is larger than a number of times of drive of another nozzle that is a nozzle different from the neighboring nozzle and in which no ejection failure has occurred and, in a dark tone, the number of times of drive of the neighboring nozzle is substantially equal to the number of times of drive of the other nozzle.

11. The image processing apparatus according to claim 4, further comprising:
a storage unit configured to store first correction information associating input threshold values and output threshold values with each other, which is for correcting the threshold values on the matrix line corresponding to the abnormal nozzle, and second correction information associating input threshold values and output threshold values with each other, which is for correcting the threshold values on the matrix line corresponding to the neighboring nozzle, wherein
the conversion unit:
performs conversion by correcting the threshold values on the matrix line corresponding to the abnormal nozzle within the threshold value matrix by using the first correction information; and
performs conversion by correcting the threshold values on the matrix line corresponding to the neighboring nozzle within the threshold value matrix by using the second correction information.

12. The image processing apparatus according to claim 11, wherein
the first correction information is information having a characteristic that the input threshold values are corrected so that, in an intermediate tone, a number of times of drive of the abnormal nozzle is smaller than a number of times of drive of another nozzle that is a nozzle different from the neighboring nozzle and in which no ejection failure has occurred and, in a dark tone, the number of times of drive of the abnormal nozzle is substantially equal to the number of times of drive of the other nozzle and
the second correction information is information having a characteristic that the input threshold values are corrected so that, in an intermediate tone, a number of times of drive of the neighboring nozzle is larger than a number of times of drive of another nozzle that is a nozzle different from the neighboring nozzle and in which no ejection failure has occurred and, in a dark tone, the number of times of drive of the neighboring nozzle is substantially equal to the number of times of drive of the other nozzle.

13. The image processing apparatus according to claim 10, further comprising:
a reading unit configured to read output results of a test chart image for generating the first correction information and the second correction information, which is output from the image forming apparatus; and
a generation unit configured to generate the first correction information and the second correction information based on image data read by the reading unit, wherein
in the test chart image:
a plurality of patches whose tones are different is arranged in a direction perpendicular to a nozzle column;
in each patch, an area corresponding to a simulated abnormal nozzle exists; and
a tone value of the area corresponding to the simulated abnormal nozzle has a value larger than 0 only in a case where another area within the patch has a maximum tone value.

14. An image forming system that forms an image on a printing medium by a print head including a nozzle column in which a plurality of nozzles is arrayed ejecting ink from the nozzles while relatively moving the printing medium in a direction perpendicular to the nozzle column, the image forming system comprising:
a detection unit configured to detect an abnormal nozzle in which an ejection failure has occurred among the plurality of nozzles;
a maintenance unit configured to perform maintenance processing for the nozzle column in a case where detection results of the abnormal nozzle do not satisfy a predetermined condition;
an image processing unit configured to generate halftone image data in which at least part of densities that are assumed to be obtained by pixels on a pixel line of the abnormal nozzle are distributed to a pixel line of a neighboring nozzle that is located in close proximity to the abnormal nozzle and in which no ejection failure has occurred and at least in part of tones, the pixel on the pixel line of the abnormal nozzle is caused to have a density in a case where the detection results of the abnormal nozzle satisfy the predetermined condition; and
an image forming unit configured to form an image on the printing medium by using the halftone image data.

15. The image forming system according to claim 14, wherein
the predetermined condition is that a number of abnormal nozzles detected by the detection unit is less than a predetermined number.

16. The image forming system according to claim 14, wherein
the predetermined condition is that a number of successive abnormal nozzles detected by the detection unit is less than a predetermined number.

17. An image processing method of generating halftone image data used by an image forming apparatus that forms an image on a printing medium by a print head including a nozzle column in which a plurality of nozzles is arrayed ejecting ink from the nozzles while relatively moving the printing medium in a direction perpendicular to the nozzle column, the image processing method comprising the steps of:
acquiring positional information for specifying an abnormal nozzle in which an ejection failure has occurred among the plurality of nozzles; and
converting, based on the acquired positional information, multi-valued input image data into the halftone image data so that (i) at least part of densities that are assumed to be obtained by a pixel line of the abnormal nozzle are distributed to pixels on a pixel line of a neighboring nozzle that is located in close proximity to the abnormal nozzle and in which no ejection failure has occurred and (ii) in the halftone image data, at least in part of tones, a pixel on the pixel line of the abnormal nozzle has a density.

18. A non-transitory computer-readable storage medium storing a program for causing a computer to perform an image processing method of generating halftone image data used by an image forming apparatus that forms an image on a printing medium by a print head including a nozzle column in which a plurality of nozzles is arrayed ejecting ink from the nozzles while relatively moving the printing medium in a direction perpendicular to the nozzle column, the image processing method comprising the steps of:

acquiring positional information for specifying an abnormal nozzle in which an ejection failure has occurred among the plurality of nozzles; and converting, based on the acquired positional information, multi-valued input image data into the halftone image data so that (i) at least part of densities that are assumed to be obtained by a pixel line of the abnormal nozzle are distributed to pixels on a pixel line of a neighboring nozzle that is located in close proximity to the abnormal nozzle and in which no ejection failure has occurred and (ii) in the halftone image data, at least in part of tones, a pixel on the pixel line of the abnormal nozzle has a density.

* * * * *